United States Patent [19]
Ninamino et al.

[11] Patent Number: 5,850,378
[45] Date of Patent: Dec. 15, 1998

[54] METHOD AND APPARATUS FOR RECORDING DATA ON AN OPTICAL DISK AND OR GROOVE

[75] Inventors: Jun-ichi Ninamino, Neyagawa; Shigeru Furumiya, Himeji; Kenji Koishi, Sanda; Yuichi Kamioka, Katano, all of Japan

[73] Assignee: Matsushita Electric Industrial Co., Ltd., Kadoma, Japan

[21] Appl. No.: 554,515

[22] Filed: Nov. 7, 1995

[30] Foreign Application Priority Data

Nov. 10, 1994 [JP] Japan ................................ 6-276447
Oct. 9, 1995 [JP] Japan ................................ 7-261238

[51] Int. Cl.$^6$ ........................................ G11B 27/36
[52] U.S. Cl. ........................ 369/54; 369/58; 369/116; 369/275.3; 369/275.4
[58] Field of Search ........................ 369/54, 58, 59, 369/102, 116, 110, 275.2, 275.3, 275.4

[56] References Cited

U.S. PATENT DOCUMENTS

| | | | |
|---|---|---|---|
| 5,138,594 | 8/1992 | Fennema | 369/44.29 |
| 5,353,277 | 10/1994 | Yasuda et al. | 369/275.4 |
| 5,448,551 | 9/1995 | Miyagawa et al. | 369/116 X |
| 5,493,552 | 2/1996 | Kobori | 369/44.26 X |
| 5,568,461 | 10/1996 | Nishiwa et al. | 369/94.26 X |
| 5,602,823 | 2/1997 | Aoki et al. | 369/275.3 |
| 5,606,543 | 2/1997 | Sugiyama | 369/275.3 X |

FOREIGN PATENT DOCUMENTS

| | | |
|---|---|---|
| 0626679 | 11/1994 | European Pat. Off. . |
| 0628952 | 12/1994 | European Pat. Off. . |
| 57-189335 | 11/1982 | Japan ................ 369/116 |
| 3252937 | 11/1991 | Japan . |
| 4341930 | 11/1992 | Japan . |
| 512807 | 1/1993 | Japan . |
| 6084172 | 3/1994 | Japan . |

OTHER PUBLICATIONS

European Search Report for Application EP 95117647.8.

*Primary Examiner*—Aristotelis M. Psitos
*Assistant Examiner*—Alan Faber
*Attorney, Agent, or Firm*—Renner, Otto, Boisselle & Sklar, P.L.L.

[57] ABSTRACT

According to the present invention, an optical disk recording method for recording data on an optical disk including a land and a groove by forming a mark representing the data on the optical disk by irradiating a light beam onto the optical disk is provided. In this method, conditions for irradiating the light beam are varied depending upon whether a position at which the mark representing the data is formed on the land or on the groove so that a size of the mark formed on the land is equal to a size of the mark formed on the groove.

14 Claims, 16 Drawing Sheets

METHOD AND APPARATUS FOR RECORDING DATA ON AN OPTICAL DISK AND OR GROOVE

BACKGROUND OF THE INVENTION

1. Field of the Invention

The present invention relates to a recording method, a recording apparatus, a reproducing method and a reproducing apparatus for an optical disk. More particularly, the present invention relates to a recording method, a recording apparatus, a reproducing method and a reproducing apparatus for a rewritable optical disk.

2. Description of the Related Art

An optical disk has been known as a large-capacity recording medium. However, a currently used optical disk no longer has a sufficiently large recording capacity for satisfying the recent requirements of further increasing the amount of the recordable data and realizing the recording of even larger-capacity data such as a video signal.

Guide grooves for guiding a light spot are generally provided for an optical disk. In a conventional optical disk, data is recorded on either one of the land (guide groove portion) or the groove (portion between the guide groove portions), because it is technologically easier. However, in recent years, a high-density recording has become more and more necessary. Reflecting such tendencies, a land/groove recording operation in which data is recorded in both of the land and the groove has become an object of much attention.

According to a conventional land/groove recording operation, the same recording method is used for recording data on the land and the groove by assuming that the recording characteristics are the same on the land and on the groove. However, in fact, the land has different recording characteristics from those of the groove. In addition, the same reproducing method is used for reproducing from the disk on which the data has been recorded. In other words, in recording and reproducing data onto/from the land and the groove, the same recording apparatus and/or the same reproducing apparatus or the recording apparatus and/or the reproducing apparatus having the same characteristics have been used.

However, the conventional technologies mentioned above have the following problems. In actuality, in recording/reproducing onto/from a land and a groove, a C/N ratio (a power ratio between carrier and noise), a recording sensitivity, frequency characteristics and the like become different from each other. In a conventional land/groove recording operation, data is recorded/reproduced onto/from a land and a groove by completely the same method. In recording data on the land and the groove having different C/N ratios by the same recording method, the recording density is set equal to the lower recording density of the land having a smaller C/N ratio, for example. As a result, unnecessarily large margin is generated in the recording density of the groove having a larger C/N ratio, and therefore, the recording density on the groove cannot be set to be maximum. Therefore, the recording density and the capacity of the recordable data cannot be maximized on the disk as a whole.

In addition, if the same recording method, e.g., a method suitably applicable to the land, is used for recording data onto the land and the groove having different recording sensitivities, then the data cannot be recorded on the groove under the optimal conditions. As a result, a bit error rate on the groove is adversely increased, and the data cannot be recorded on the groove at a sufficiently high recording density.

Furthermore, according to a conventional method, in performing a reproducing operation, an equalization (or a correction) of the frequency components, such as the emphasis of high frequency components, has been performed by utilizing the same frequency characteristics. However, the frequency characteristics of the signal reproduced from the land are different from those of the signal reproduced from the groove. Therefore, if the signal reproduced from the land is equalized with the signal reproduced from the groove by utilizing the same frequency characteristics, the frequency characteristics of the signal reproduced from the land cannot be suitably equalized with those of the signal reproduced from the groove.

SUMMARY OF THE INVENTION

According to the present invention, an optical disk recording method for recording data on an optical disk including a land and a groove by forming a mark representing the data on the optical disk by irradiating a light beam onto the optical disk is provided. In this method, conditions for irradiating the light beam are varied depending upon whether a position at which the mark representing the data is formed is located on the land or on the groove so that a size of the mark formed on the land is equal to a size of the mark formed on the groove.

In one embodiment, the light beam is irradiated at a different intensity depending upon whether the light beam is irradiated onto the land or onto the groove.

According to another aspect of the present invention, an optical disk recording apparatus for recording data on an optical disk including a land and a groove by forming a mark representing the data on the optical disk by irradiating a light beam onto the optical disk is provided. The optical disk recording apparatus includes a means for varying conditions for irradiating the light beam depending upon whether a position at which the mark representing the data is formed is located on the land or on the groove so that a size of the mark formed on the land is equal to a size of the mark formed on the groove.

In one embodiment, the optical disk recording apparatus includes a means for recording the data by irradiating the light beam at a different intensity depending upon whether the light beam is irradiated onto the land or onto the groove.

In another embodiment, an intensity of the light beam irradiated onto the land is higher than an intensity of the light beam irradiated onto the groove.

In still another embodiment, the optical disk recording apparatus includes: a means for generating land/groove position information showing whether a spot of the light beam is located on the land or on the groove; and a means for irradiating the light beam at a different intensity based on the land/groove position information.

In still another embodiment, the optical disk recording apparatus includes: a data division means for dividing an input data into a first data and a second data; a first light beam generation means for recording the first data on the land by irradiating a light beam having a first intensity onto the land; and a second light beam generation means for recording the second data on the groove by irradiating a light beam having a second intensity onto the groove.

In still another embodiment, the optical disk includes a phase-changeable recording layer.

In still another embodiment, the light beam is irradiated for a different time period depending upon whether the light beam is irradiated onto the land or onto the groove.

In still another embodiment, a time period during which the light beam is irradiated onto the land is longer than a time period during which the light beam is irradiated onto the groove.

In still another embodiment, the optical disk recording method includes a step of irradiating the light beam n (where n is an integer equal to or larger than 2) times in order to form the mark. In this method, a timing for performing a first irradiation and a timing for performing an n-th irradiation are varied depending upon whether the light beam is irradiated onto the land or onto the groove.

In still another embodiment, the optical disk recording apparatus includes: a means for generating land/groove position information showing whether a spot of the light beam is located on the land or on the groove; and a means for irradiating the light beams n (where n is an integer equal to or larger than 2) times in order to form the mark and varying a timing for performing a first irradiation and a timing for performing an n-th irradiation depending upon whether the light beam is irradiated onto the land or onto the groove.

In still another embodiment, an interval between the first irradiation and the n-th irradiation for the land is longer than an interval between the first irradiation and the n-th irradiation for the groove.

According to still another aspect of the present invention, an optical disk recording method for recording data on an optical disk including a land and a groove by forming a mark representing the data on the optical disk by irradiating a light beam onto the optical disk is provided. In this method, conditions for recording the data are varied depending upon whether the light beam is irradiated onto the land or onto the groove.

In one embodiment, the data is recorded at a different density depending upon whether the light beam is irradiated onto the land or onto the groove.

In another embodiment, a density of the data recorded on the land is lower than a density of the data recorded on the groove.

According to still another aspect of the present invention, an optical disk reproducing method for reproducing data recorded on an optical disk including a land and a groove by irradiating a light beam onto the optical disk is provided. The method includes a step of combining data which are reproduced from the land and the groove and have different transfer rates in a case where a recording density of the data recorded on the land is different from a recording density of the data recorded on the groove depending upon whether the data is recorded on the land or on the groove.

According to still another aspect of the present invention, an optical disk reproducing method for reproducing data recorded on an optical disk including a land and a groove by irradiating a light beam onto the optical disk is provided. The method includes a step of combining data which are reproduced from the land and the groove and have different transfer rates in a case where a recording density of the data recorded on the land is lower than a recording density of the data recorded on the groove.

In one embodiment, the optical disk recording method includes a step of recording the data by a different modulation method depending upon whether the light beam is irradiated onto the land or onto the groove.

In another embodiment, a density ratio of the modulation method used for recording the data on the land is lower than a density ratio of the modulation method used for recording the data on the groove.

According to still another aspect of the present invention, an optical disk reproducing method for reproducing data recorded on an optical disk including a land and a groove by irradiating a light beam onto the optical disk is provided. The method includes a step of demodulating the data by a different method depending upon whether the data is reproduced from the land or from the groove in a case where a different modulation method is used depending upon whether the data is recorded on the land or on the groove.

According to still another aspect of the present invention, an optical disk reproducing method for reproducing data recorded on an optical disk including a land and a groove by irradiating a light beam onto the optical disk is provided. The method includes a step of demodulating the data by a different method depending upon whether the data is reproduced from the land or from the groove in a case where a density ratio of the modulation method used for the land is lower than a density ratio of the modulation method used for the groove.

According to still another aspect of the present invention, an optical disk reproducing method for reproducing data recorded on an optical disk including a land and a groove by irradiating a light beam onto the optical disk is provided. The method includes a step of equalizing the reproduced data using different frequency characteristics depending upon whether the data is recorded on the land or on the groove.

According to still another aspect of the present invention, an optical disk reproducing apparatus for reproducing data recorded on an optical disk including a land and a groove by irradiating a light beam onto the optical disk is provided. The apparatus includes a means of equalizing the reproduced data using different frequency characteristics depending upon whether the data is recorded on the land or on the groove.

In one embodiment, high frequency components of the data reproduced from the land are amplified by a larger gain than a gain used for amplifying high frequency components of the data reproduced from the groove.

Thus, the invention described herein makes possible the advantage of providing a recording method, a recording apparatus, a reproducing method and a reproducing apparatus for an optical disk in which the recording capacity of the optical disk can be increased, the transfer rate can be improved, and the quality of the reproduced signal can be improved by performing the recording and reproducing operations in accordance with recording sensitivities, C/N ratios and frequency characteristics of the land and the groove.

This and other advantages of the present invention will become apparent to those skilled in the art upon reading and understanding the following detailed description with reference to the accompanying figures.

DESCRIPTION OF THE PREFERRED EMBODIMENTS

Figure 1A:
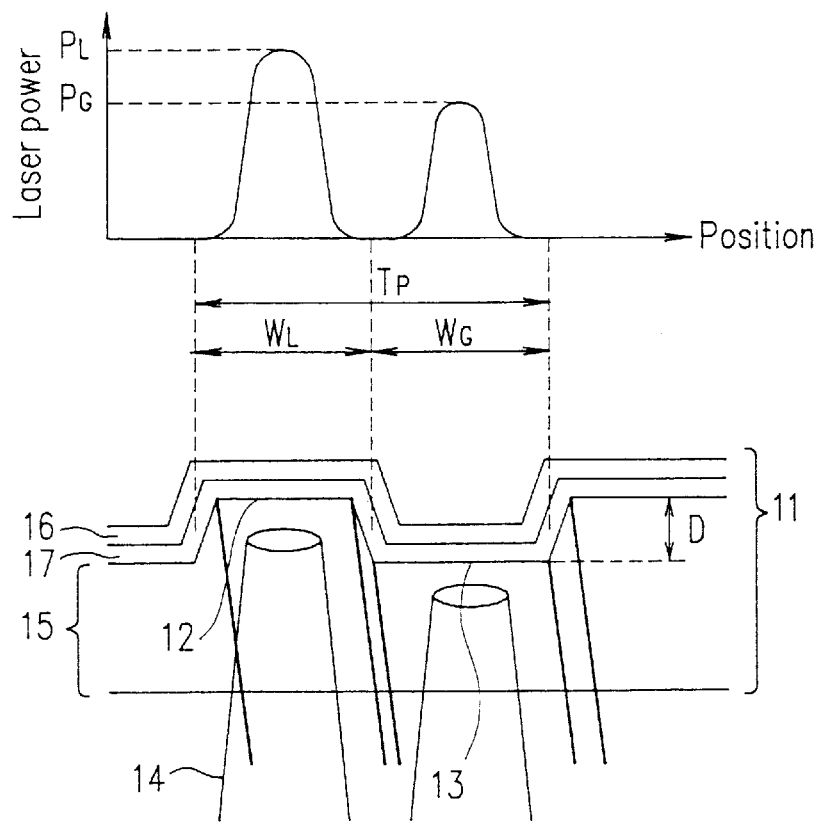
FIG. 1A shows the relationship between a position on an optical disk and an intensity of a laser beam in a method for recording on an optical disk according to a first example of the present invention.

In a recording method, a recording apparatus, a reproducing method and a reproducing apparatus for an optical disk according to the present invention, the recording and reproducing operations are performed by using different laser powers, recording compensations, recording densities, modulation methods and frequency characteristics depending upon whether the recording or the reproduction is performed for a land of the optical disk or a groove thereof.

Hereinafter, the present invention will be described in detail by way of illustrative examples with reference to the accompanying drawings. In the drawings, the same reference numerals denote the same components throughout the following examples.

In this specification, a "recording apparatus" includes a recording apparatus including a section for reproducing data. Similarly, a "reproducing apparatus" includes a reproducing apparatus including a section for recording data.

EXAMPLE 1

FIG. 1A shows the relationship between a position on an optical disk and an intensity of a laser beam in a method for recording on an optical disk according to a first example of the present invention. An optical disk 11 is a disk-shaped recording medium. On at least one surface of the optical disk 11, lands 12 and grooves 13 for recording data thereon are provided. The optical disk 11 includes: a substrate 15 containing polycarbonate; a reflective layer 16 containing aluminum; and a recording layer 17 containing an alloy of germanium, tellurium and antimony. Throughout the following examples, this optical disk 11 will be used. The lands 12 and the grooves 13 are formed in a spiral shape on the surface of the optical disk 11, and digital data is recorded on the lands 12 and the grooves 13. Hereinafter, the operation for recording data on both of the lands 12 and the grooves 13 will be called a "land/groove recording operation", for simplification. The optical disk 11 is an optical disk for which the land/groove recording operation can be performed. When data is recorded, reproduced and erased onto/from the optical disk 11, a laser beam 14 is irradiated from a laser diode (not shown) onto the land 12 or the groove 13.

The optical disk 11 is, for example, a phase-changeable optical disk. In such a case, an intense laser beam is irradiated onto the disk for a short period of time for recording data on the disk. Upon the laser beam irradiation, the portion of the disk irradiated with the intense laser beam, or the spot of the laser beam, is heated to a temperature equal to or higher than the melting point of the material of the disk 11, and then rapidly cooled, so that the phase of the irradiated portion is turned into amorphous. This amorphous portion is recorded on the disk along a land or a groove as a "mark". In order to erase this mark, the mark is required to be heated to a crystallization temperature thereof or higher, and gradually cooled down over a long period of time. As a result, since the phase of the mark is turned into crystalline again, the mark can be erased. In reproducing data from the disk, less intense laser beam than that used in recording data thereon is irradiated onto the disk 11. Since the amorphous phase (corresponding to the mark portion) and the crystalline phase (corresponding to the non-mark portion) have different reflectances, it is possible to distinguish whether or not the irradiated portion is the mark based on the intensity of the reflected light.

In this specification, a portion of the disk which projects to the light incoming side will be called a "groove", while a portion of the disk which projects to the opposite side to the light incoming side will be called a "land". In the optical disk 11 having a structure shown in FIG. 1A, when the land 12 and the groove 13 have the same width, the groove 13 has a higher recording sensitivity than that of the land 12 because of the difference in the radiation conditions and the like. The "recording sensitivity" is determined by the recording laser power and the erasure laser power necessary for obtaining a C/N ratio of 50 dB and an erasability of 25 dB during the recording/reproducing operations (hereinafter, these powers will be called "optimum recording power" and "optimum erasure power", respectively). Therefore, the smaller the optimum recording power and the optimum erasure power are, the higher the recording sensitivity becomes. Under the condition where the phase-changeable optical disk is made of the above-described material; the land width WL and the groove width WG are 0.74 $\mu$m; the track pitch TP is 1.48 $\mu$m; the depth D is $\lambda/6$ (where $\lambda$ is 680 nm); and the linear velocity of the spot of the laser beam along the peripheral direction is 6.0 m/s (this condition is used for the first to the sixth examples), the optimum recording power is 11 mW and the optimum erasure power is 5.5 mW on the land, while the optimum recording power is 10 mW and the optimum erasure power is 5.0 mW on the groove. In this case, since the groove 13 has a higher recording sensitivity than that of the land 12, data can be recorded on the groove 13 at a lower laser power than the laser power required for recording the data on the land 12.

In the first example, in performing the land/groove recording operation for the optical disk 11, the laser power is set at different values in recording data on the land 12 and in recording the data on the groove 13 in accordance with the difference in the recording sensitivity between the land 12 and the groove 13. More specifically, as shown in FIG. 1A, the data is recorded on the land 12 at a laser power having a peak value PL and on the groove 13 at a laser power having a peak value PG. In this case, if the lengths of the marks to be formed on the land 12 and on the groove 13 are the same, then the width of the pulse for driving the laser diode is the same in both cases of recording the data on the land 12 and recording the data on the groove 13. Therefore, the data can be appropriately recorded on the land 12 and the groove 13, respectively. If the data is recorded on the groove 13 having a higher recording sensitivity at the laser power having a peak value PL, then the width and the length of the mark portion recorded on the groove 13 exceed desired values, so that the bit error rate is adversely increased during the reproducing operation. To the contrary, if the data is recorded on the land 12 having a lower recording sensitivity at the laser power having a peak value PG, then the width and the length of the mark portion recorded on the land 12 become smaller than the desired values, so that the bit error rate is also increased during the reproducing operation.

Figure 1B:
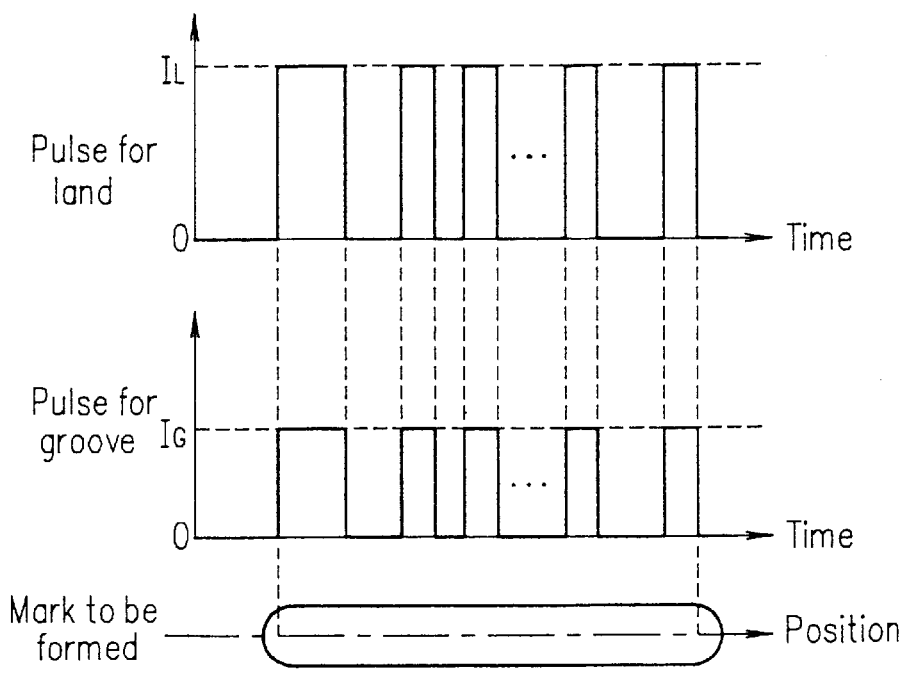
FIG. 1B shows the waveform of the pulse used for recording data on a land and the waveform of the pulse used for recording data on a groove in a method for recording on an optical disk according to a first example of the present invention.

FIG. 1B shows the waveform of the pulse used for recording data on a land and the waveform of the pulse used for recording data on a groove in a method for recording on an optical disk according to the first example of the present invention. The amplitude IL of the pulse for recording on a land is larger than the amplitude IG of the pulse for recording on a groove.

Figure 2:
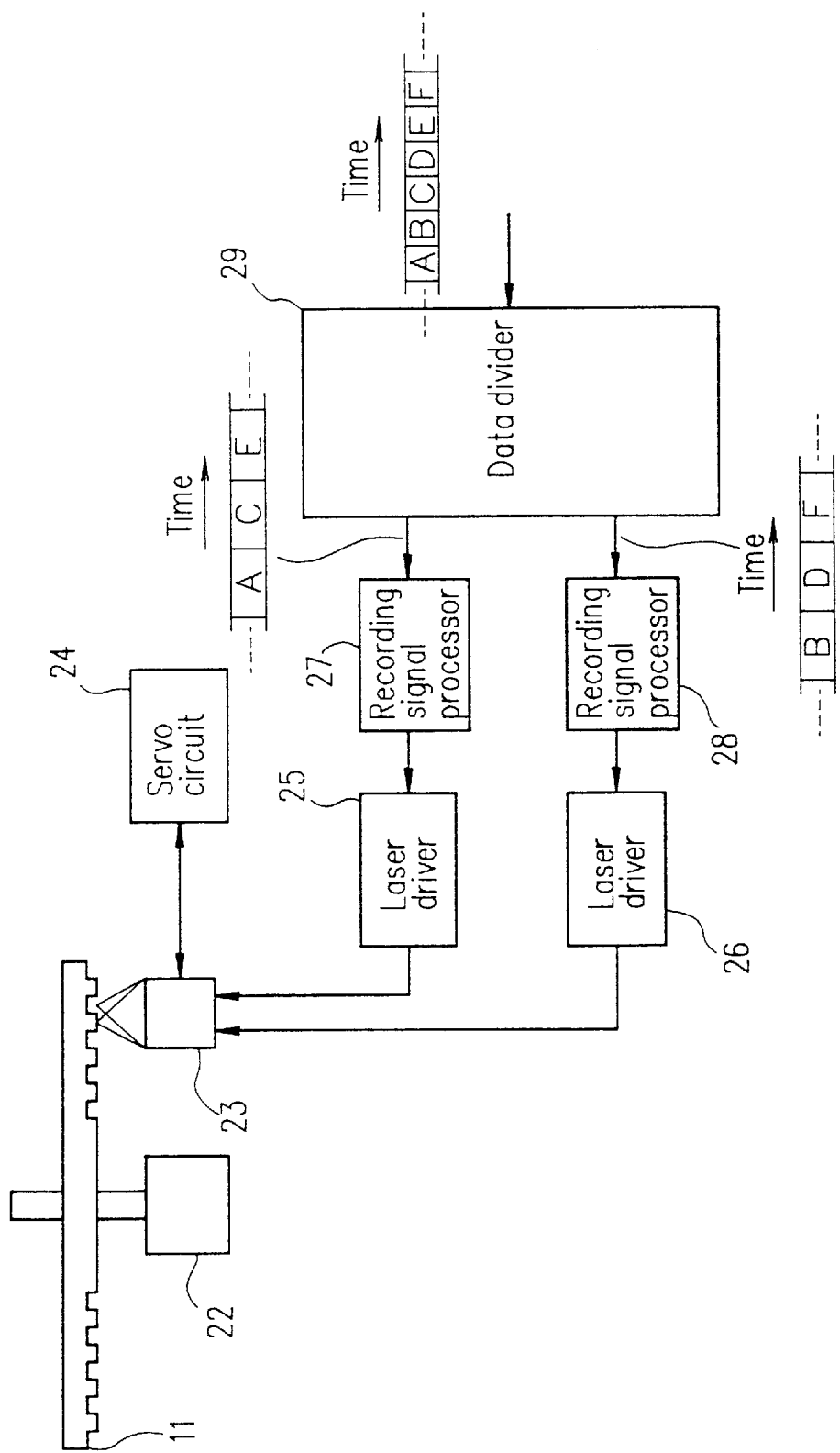
FIG. 2 is a block diagram showing a configuration for an apparatus for recording on an optical disk according to the first example of the present invention.

FIG. 2 is a block diagram showing a configuration for an apparatus for recording on an optical disk according to the first example of the present invention. On a phase-changeable optical disk 11 for which the land/groove recording operation can be performed, digital data are recorded by performing a mark edge recording operation. The "mark edge recording operation" is a recording operation in which the digital data is represented by the position of the edge of the mark portion which is recorded on the disk along the peripheral direction thereof. In the optical disk 11, the groove 13 has a higher recording sensitivity than that of the land 12. A spindle motor 22 rotates the optical disk 11, whereby an optical head 23 for irradiating two light beams can trace the spiral land and groove. An optical head 23 irradiates one of the two light beams onto the land and the other light beam onto the groove, so that data can be simultaneously recorded on the land and on the groove. A servo circuit 24 performs not only the focusing of the laser beams emitted from the optical head 23 on the land and the groove, but also the tracking.

A data divider 29 divides one input data stream into two output data streams and then outputs the data streams. More specifically, the data divider 29 divides the input data stream into a land data stream and a groove data stream so that the two output data streams have an equal transfer rate. The land data stream is supplied to a recording signal processor 27, and the groove data stream is supplied to a recording signal processor 28. In FIG. 2, the input data stream is schematically represented by "A, B, C, D, E, F"; the land data stream by "A, C, E"; and the groove data stream by "B, D, F".

The recording signal processors 27 and 28 receive the land data stream and the groove data stream, respectively, and perform modulation and recording compensation therefor. As a modulation method, an eight to fourteen modulation (EFM) is used, for example. The recording compensation is performed, for example, by making different timings for generating a plurality of pulses (or by "multi-pulse") to be described later on the land from those on the groove. The recording signal processor 27 outputs a land recording signal corresponding to the land data stream to a laser driver 25, while the recording signal processor 28 outputs a groove recording signal corresponding to the groove data stream to a laser driver 26.

The laser drivers 25 and 26 modulate a sufficient amount of current required for emitting light from the laser diode (not shown) of the optical head 23 in response to the input land recording signal and groove recording signal, and then output the recording signals to the optical head 23. The optical head 23 irradiates two laser beams onto the optical disk 11 in response to the amplified land recording signal and groove recording signal, thereby recording the land data stream and the groove data stream on the optical disk 11.

The outputs of the laser drivers 25 and 26 are set in view of the above-mentioned difference between the recording sensitivity of the land and that of the groove. That is to say, the land recording signal has a higher power than that of the groove recording signal. More specifically, in the case of using an optical disk 11 having the above-described parameters, the peak values PL and PG shown in FIG. 1A are 11 Mw and 10 mW, respectively. As shown in FIG. 1B, the pulse for recording on a land and the pulse for recording on a groove have different peak values for the current supplied thereto. In FIG. 1B, a plurality of pulses are used for forming a single mark, but the number of the pulses are not limited thereto. For example, a single mark can be formed by a single pulse.

In order to compensate for the difference between the recording sensitivity of the land and that of the groove, the following relationship is preferably satisfied:

(optimum recording power for land):(optimum recording power for groove)=(peak value PL):(peak value PG)

In the first example, as conditions for irradiating the light beam, the intensity of the laser beam is varied based on whether a position of laser beam spot is located on the land or on the groove.

As described above, in the first example, the land/groove recording operation is performed so that the laser power is set at different values in recording data on a land and in recording data on a groove in accordance with the difference in the recording sensitivity between the land and the groove. Therefore, the data can be recorded on the land and the groove having respectively different recording sensitivities at appropriate laser powers. As a result, the bit error rate can be advantageously reduced in reproducing data from an optical disk.

Figure 3:
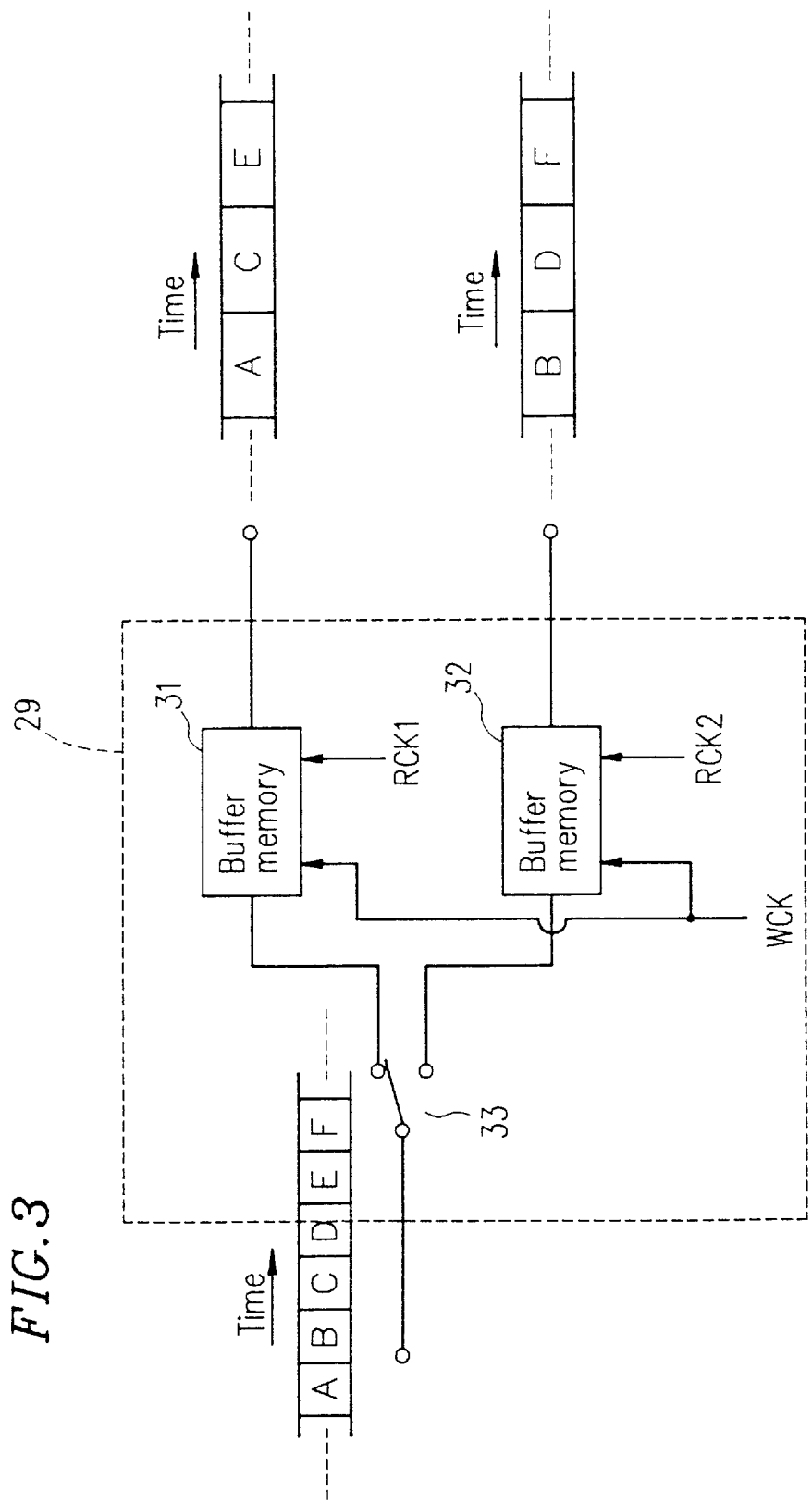
FIG. 3 is a block diagram showing a configuration for the data divider shown in FIG. 2.

FIG. 3 is a block diagram showing a configuration for the data divider 29 shown in FIG. 2. A switch 33 alternately outputs the data A, B, C, D, E and F of the input data stream "A, B, C, D, E, F" to buffer memories 31 and 32. In this case, the data A to F constituting the input data stream are data packets having an equal data length. The buffer memory 31 receives the data A, C and E, while the buffer memory 32 receives the data B, D and F. The frequency of a write clock WCK is twice of the frequency of the read clocks RCK1 and RCK2. However, the configuration of the data divider 29 is not limited to that shown in FIG. 3. For example, the input data stream can be received not by the two buffer memories but by a single buffer memory. In the latter case, the switch for distributing the output data is turned in accordance with the address designated in the reading operation.

As described above, the optical head 23 simultaneously records the data on the land and the groove by irradiating the two laser beams onto the land and the groove of the optical disk 11. Alternatively, the recording operation can be performed by irradiating a single laser beam onto the optical disk 11.

Figure 4:
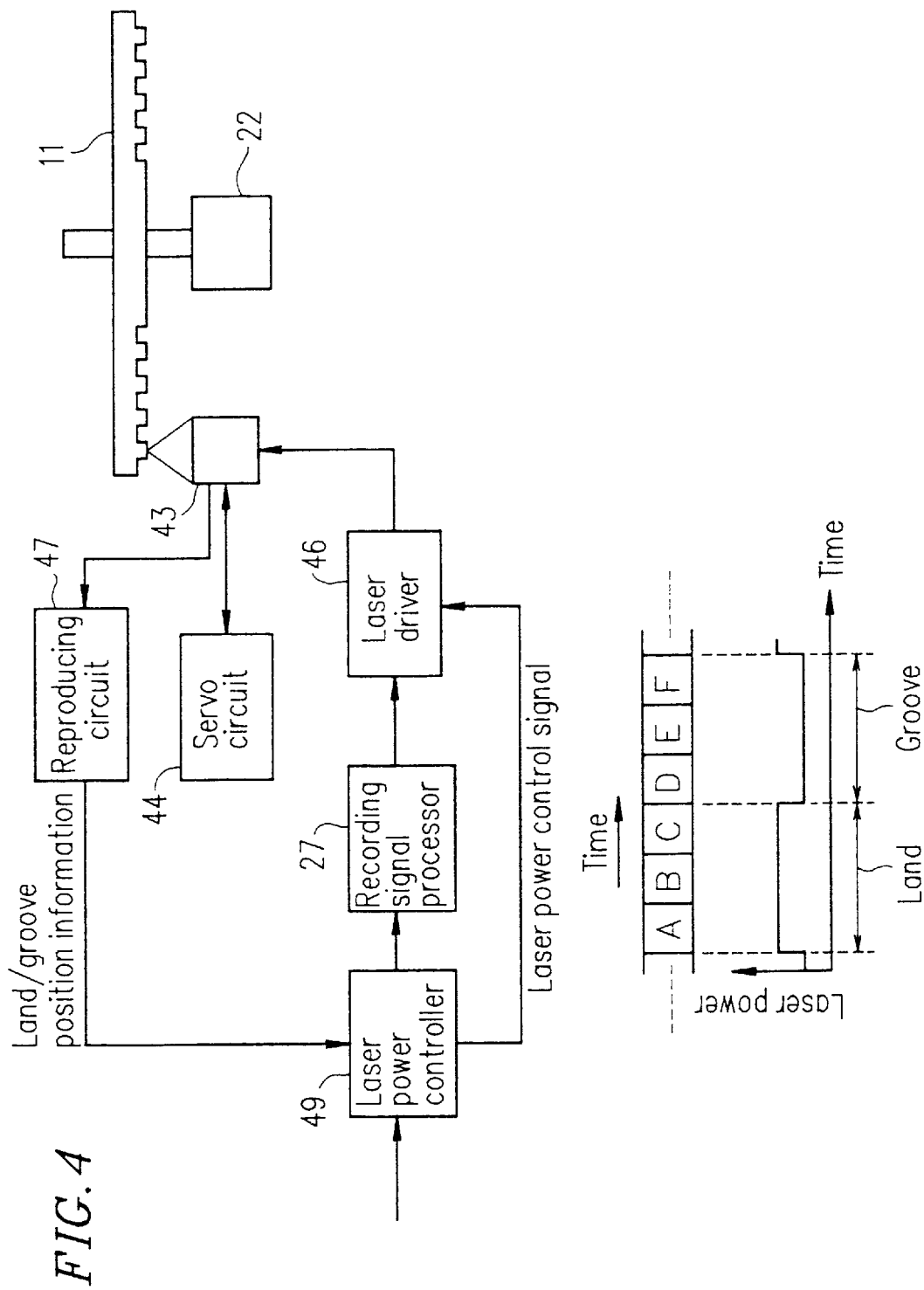
FIG. 4 is a block diagram showing a configuration for an apparatus for recording on an optical disk using an optical head for irradiating a single laser beam.

FIG. 4 is a block diagram showing a configuration for an apparatus for recording on an optical disk using an optical head for irradiating a single laser beam. A laser power controller 49 receives the input data stream and land/groove position information output from the reproducing circuit 47, and outputs the buffered input data stream to the recording signal processor 27 and a laser power control signal to a laser driver 46. The land/groove position information is information showing whether the optical head 43 is located on a land or on a groove. The land/groove position information can be obtained, for example, from the address data of a sector. That is to say, the reproducing circuit 47 simultaneously reads out the data of each sector and the address data thereof. Therefore, if a sector address is given, it is possible to identify whether the sector is located on a land or on a groove. The laser power control signal is supplied to the laser driver 46, thereby changing the power of the laser beam to be irradiated onto the optical disk 11. Based on the land/groove position information, the laser power controller 49 sets the laser power to be high when the optical head 43 is located on a land and sets the laser power to be low when the optical head 43 is located on a groove. As shown in FIG. 4, in recording the data A, B and C, the optical head 43 is located on a land, so that the laser power becomes high. On the other hand, in recording the data D, E and F, the optical head 43 is located on a groove, so that the laser power becomes low. The information of the laser power to be used for the land and the groove is written, for example, on the pits in a lead-in area located on the inside of a track on the disk.

The apparatus for recording on an optical disk having the configuration shown in FIG. 4 includes a single recording signal processor and a single laser driver, and therefore, the size of the apparatus can be reduced.

EXAMPLE 2

Figure 5:
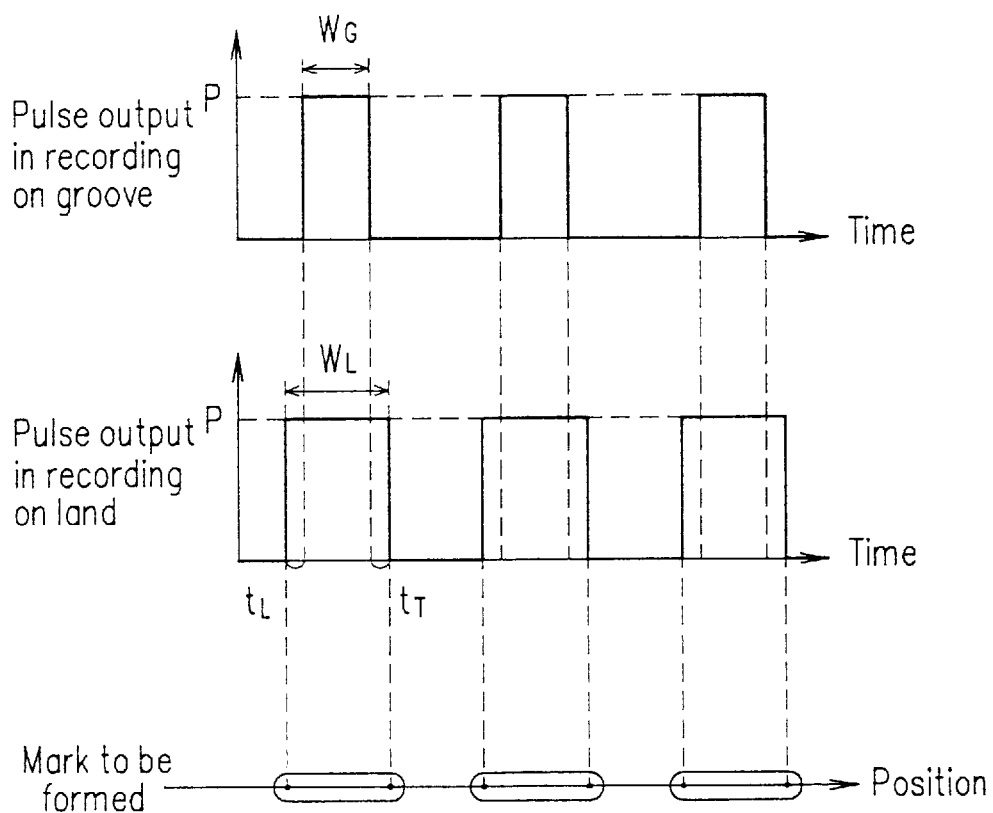
FIG. 5 shows the waveform of the pulse used for recording data on a land and the waveform of the pulse used for recording data on a groove in a method for recording on an optical disk according to a second example of the present invention.

FIG. 5 shows the waveform of the pulse used for recording data on a land and the waveform of the pulse used for recording data on a groove in a method for recording on an optical disk according to a second example of the present invention. In the second example, the same optical disk 11 as that used in the first example is also used. That is to say, in the optical disk 11 of the second example, the land 12 and the groove 13 have an equal width, and the recording sensitivity of the groove 13 is higher than the recording sensitivity of the land 12.

Therefore, in the case of performing a land/groove recording operation for such an optical disk, the bit error rate during the reproducing operation can be reduced by performing the recording compensation in view of the difference between the recording sensitivity of a land and that of a groove. More specifically, the width of the pulse for forming a mark is varied depending upon whether the mark is formed on a land or on a groove. As a result, an error is unlikely to be caused at an edge position of the mark recorded on the land or the groove. As shown in FIG. 5, a mark signal for recording a mark on a land and a mark signal for recording a mark on a groove show the pulses having an equal peak value P. However, since the recording sensitivity of a land is lower than that of a groove, the laser power required for forming a mark on a land is higher than the laser power required for forming the same mark on a groove. Therefore, the leading edge of the pulse for recording a mark on a land is earlier than the leading edge of the pulse for recording a mark on a groove by a time period tL, and the trailing edge of the pulse for recording a mark on a land is later than the trailing edge of the pulse for recording a mark on a groove by a time period tT.

Figure 6:
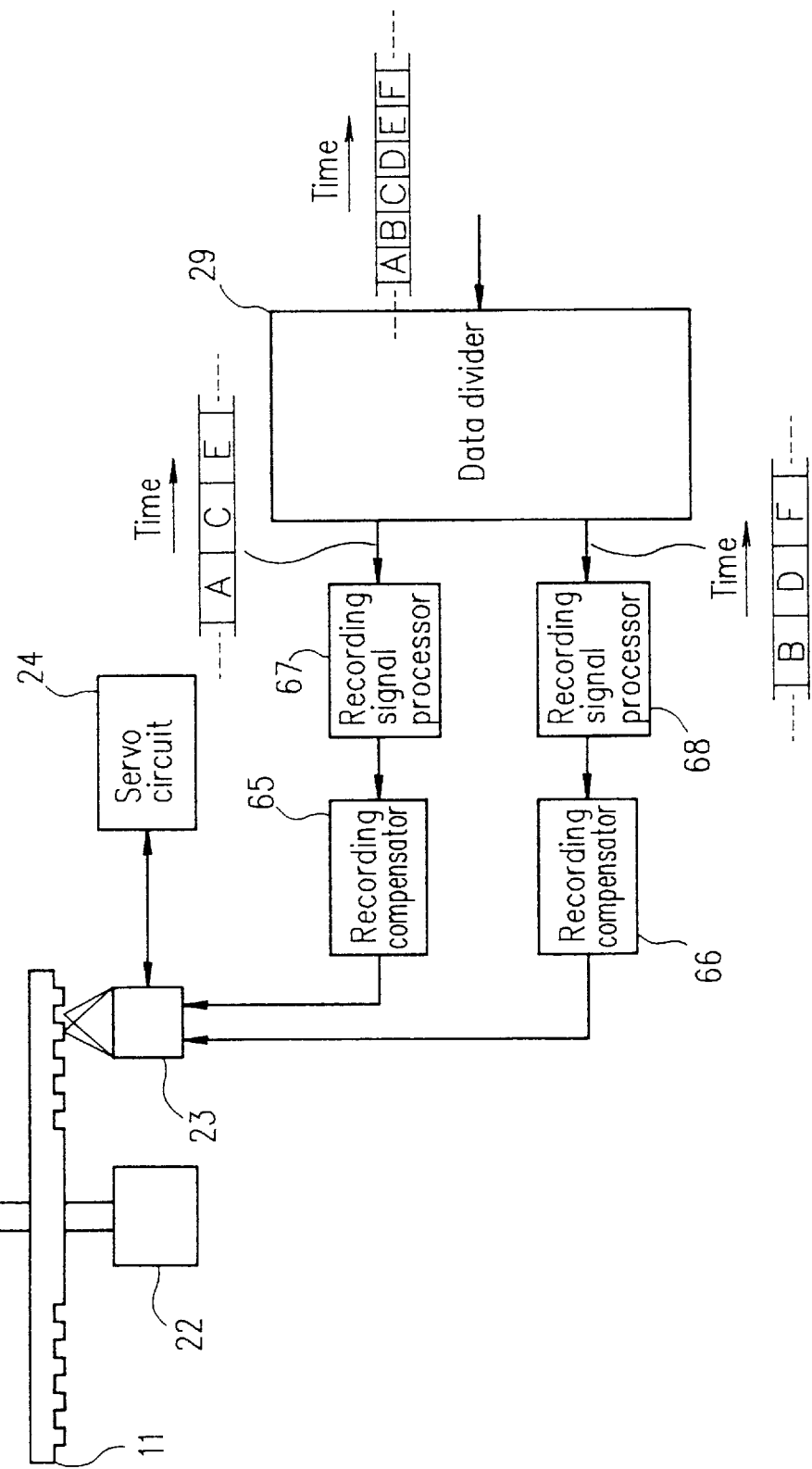
FIG. 6 is a block diagram showing a configuration for an apparatus for recording on an optical disk according to the second example of the present invention.

FIG. 6 is a block diagram showing a configuration for an apparatus for recording on an optical disk according to a second example of the present invention. On a phase-changeable optical disk 11 for which the land/groove recording operation can be performed, digital data are recorded by performing a mark edge recording operation. A data divider 29 divides one input data stream into two output data streams, i.e., a land data stream and a groove data stream, and then outputs the two data streams as described in the first example.

A recording signal processor 67 receives and modulates the land data stream and then outputs a land recording signal corresponding to the land data stream to a recording compensator 65. A recording signal processor 68 receives and modulates the groove data stream and then outputs a groove recording signal corresponding to the groove data stream to a recording compensator 66. As a modulation method, an EFM is used, for example.

The recording compensators 65 and 66 receive the land recording signal and the groove recording signal, respectively, and compensate for the edge position of the mark to be recorded. More specifically, the pulse widths of the recording signals are set so that the width of the pulse for recording a mark on a land having a lower recording sensitivity (hereinafter, simply referred to as a "pulse for a land") is larger than the width of the pulse for recording a mark on a groove having a higher recording sensitivity (hereinafter, simply referred to as a "pulse for a groove"). The pulse for a land and the pulse for a groove have an equal amplitude (or the laser power). If a laser beam is irradiated onto a land and a groove at the same pulse width and the same pulse amplitude, the length of the mark formed on the land having a lower sensitivity becomes shorter than the length of the mark formed on the groove having a higher sensitivity (this is called an "edge shift"). Therefore, by setting the width of the pulse for a land to be larger than the width of the pulse for a groove, the compensation can be performed so that the edges of the marks to be recorded on the land and the groove are located at the same position (or so that an edge shift is not caused).

The recording compensators 65 and 66 include the same functions as those of the laser drivers of the first example. The optical head 23 irradiates two laser beams onto the optical disk 11 in response to the compensated outputs from the recording compensators 65 and 66, thereby recording the land data stream and the groove data stream onto the optical disk 11.

In the second example, as conditions for irradiating the light beam, the width of the pulse for recording (namely, the position of the leading edge and the trailing edge of the pulse for recording) is varied based on whether a position of laser beam spot is located on the land or on the groove. By recording the data in the above-described manner, the mark can be recorded on a land and a groove without causing an edge shift on the land and the groove even if the recording sensitivity of the land is different from that of the groove in the optical disk.

In the case of using an optical disk 11 having the parameters described in the first example, the respective values shown in FIG. 5 are as follows: the time tL is 2 ns; the time tT is 2 ns; the width WL of the pulse for a land is 74 ns; and the width WG of the pulse for a groove is 70 ns.

In the same way as in the first example, an optical head 43 for emitting a single laser beam can be used instead of the optical head 23 for emitting two laser beams in this example, too.

EXAMPLE 3

Figure 7:
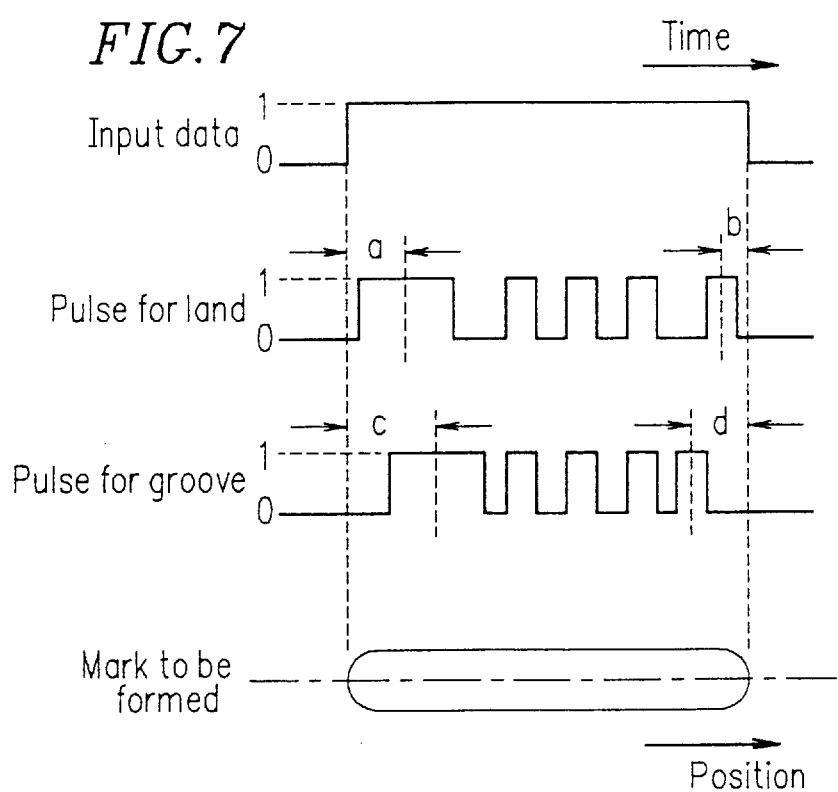
FIG. 7 shows the waveform of the pulse for a land and the waveform of the pulse for a groove in a method for recording on an optical disk according to a third example of the present invention.

FIG. 7 shows the waveform of the pulse for a land and the waveform of the pulse for a groove in a method for recording on an optical disk according to a third example of the present invention. In the second example, a single pulse for a land or a single pulse for a groove is used for recording a single mark as shown in FIG. 5. In the third example, a plurality of pulses are used for recording a single mark. This pulse chain recording method is referred to as "multi-pulse" method. A "single pulse" herein refers to a waveform beginning with the transition from a first level to a second level and terminating with the subsequent transition from the second level to the first level. For example, in FIG. 5, a pulse for recording a single mark begins with the transition from the L level to the H level and terminates with the subsequent transition from the H level to the L level.

In FIG. 7, an input data for recording a single mark is a single pulse. The pulse for a land and the pulse for a groove corresponding to the input data have a first pulse, an intermediate pulse and a last pulse, respectively. The input data shown in FIG. 7, i.e., the pulse for a land and the pulse for a groove are digital data having a value "0" or "1". The "first pulse" is the first pulse of a number n (n is equal to or larger than 2) of pulses, while the "last pulse" is the n-th pulse of a number n of pulses. When n is 2, it follows that the intermediate pulse is the same as the last pulse. In FIG. 7, three intermediate pulses exist between the first pulse and the last pulse.

The first pulse has a leading edge delayed from the leading edge of the input data by a predetermined delay time, and the last pulse has a trailing edge preceded from the trailing edge of the input data by a predetermined preceding time. In FIG. 7, the interval between the leading edge of the input data and the center of the first pulse of the pulses for a land is defined as a delay time a; the interval between the leading edge of the input data and the center of the first pulse of the pulses for a groove is defined as a delay time c; the interval between the trailing edge of the input data and the center of the last pulse of the pulses for a land is defined as a preceding time b; and the interval between the trailing edge of the input data and the center of the last pulse of the pulses for a groove is defined as a preceding time d. If the recording sensitivity of a groove is higher than the recording sensitivity of a land, the pulses for a land and the pulses for a groove are required to be set so as to satisfy the relationships that (delay time a)<(delay time c) and that (preceding time b)<(preceding time d). This is because, since a groove has a higher recording sensitivity than that of a land, the recording of the data on a land and a groove using pulses having the same waveform makes larger the width and the length of the mark recorded on the groove than those of the mark recorded on the land. To the contrary, if the recording sensitivity of a land is higher than that of a groove, the pulses for a land and the pulses for a groove are required to be set so as to satisfy the relationships that (delay time c)<(delay time a) and that (preceding time d)<(preceding time b).

Irradiation of a laser beam is substantially simultaneous with application of the pulse for recording. In this specification, a time interval between the irradiation by the first pulse and the irradiation by the last pulse is defined to be equal to a time interval between the center of the first pulse and the center of the last pulse. The "center of the pulse" is located on a center between the leading edge and the trailing edge of the pulse. As shown in FIG. 7, the time interval between the center of the first pulse and the center of the last pulse for recording on a land is longer than the time interval between the center of the first pulse and the center of the last pulse for recording on a groove.

The intermediate pulses are repetitive pulses (or burst pulses). The pulses having the same waveform and the same phase position are used for the pulses for a land and the pulses for a groove.

Figure 8:
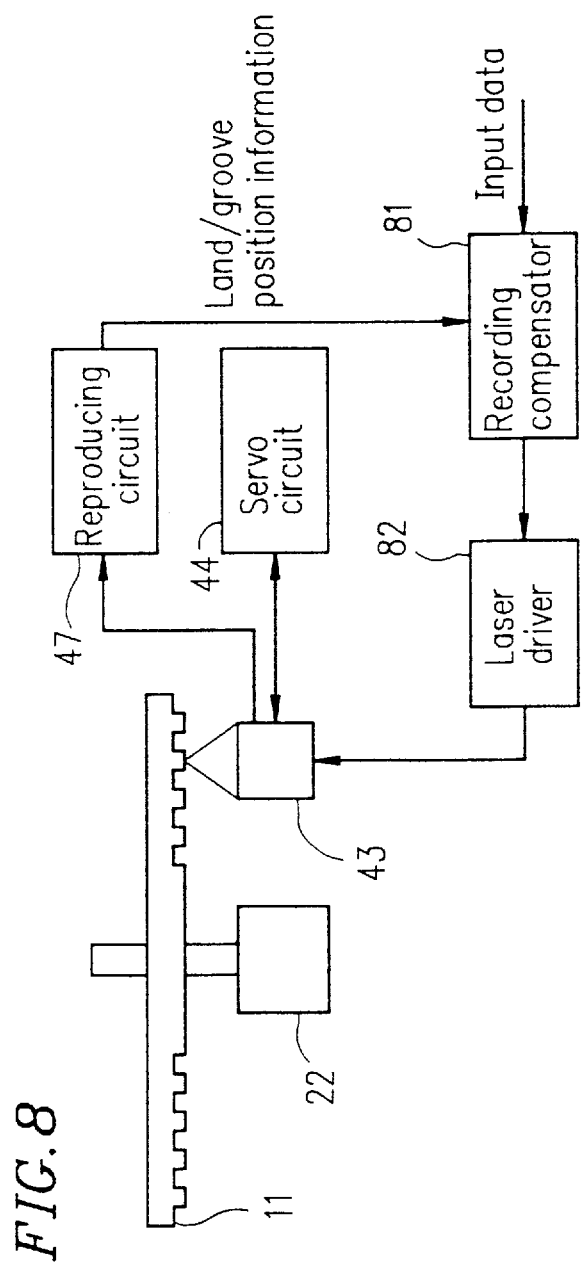
FIG. 8 is a block diagram showing a configuration for an apparatus for recording on an optical disk according to the third example of the present invention.

FIG. 8 is a block diagram showing a configuration for an apparatus for recording on an optical disk according to the third example of the present invention. The apparatus for recording on an optical disk shown in FIG. 8 records data on an optical disk in which the recording sensitivity of a land is different from that of a groove by using the pulses for a land and the pulses for a groove shown in FIG. 7.

An optical head 43 and a servo circuit 44 have the same functions as those of the optical head 43 and the servo circuit 44 described with reference to FIG. 4. A recording compensator 81 receives an input data to be recorded and then modulates the data. As a modulation method for performing a mark edge recording, an EFM is used for example, but is not limited thereto. A (1, 7) modulation or a (2, 7) modulation can also be used. Based on land/groove position information output from the reproducing circuit 47, the recording compensator 81 generates similar pulses for a land or for a groove to those shown in FIG. 7, and outputs the pulses to a laser driver 82. The land/groove position information may be generated as described referring to FIG. 4. The laser driver 82 receives the pulses for a land and the pulses for a groove, so as to output a power high enough to drive the laser diode (not shown) of the optical head 43. The laser driver 82 modulates the laser diode using the recording power and the erasure power, thereby recording data on the disk.

In the case where the optimum recording power for a land of the optical disk is 10 mW and the optimum recording power for a groove of the optical disk is 5 mW, if the delay times a and c are set to be 35 ns and 37 ns and the preceding times b and d are set to be 35 ns and 37 ns, respectively, a mark having an equal length along the peripheral direction of the disk can be formed on both of the land and the groove.

In the third example, as conditions for irradiating the light beam, the timing for generating a plurality of pulses is varied based on whether a position of laser beam spot is located on the land or on the groove. In the apparatus for recording on an optical disk having the above-described configuration, even when the recording sensitivity of a land is different from that of a groove, a mark having the same shape can be recorded on the land and the groove by using a plurality of different pulses (or by multi-pulse) in recording data on the land and in recording data on the groove. As a result, the quality of the reproduced signals, such as a bit error rate, an amount of margin in the servo control and an amount of jitter, becomes the same on the land and on the groove. Therefore, since the data can be recorded on the land and the groove at the same recording density, the data can be recorded at a high density on the optical disk as a whole.

EXAMPLE 4

Figure 9:
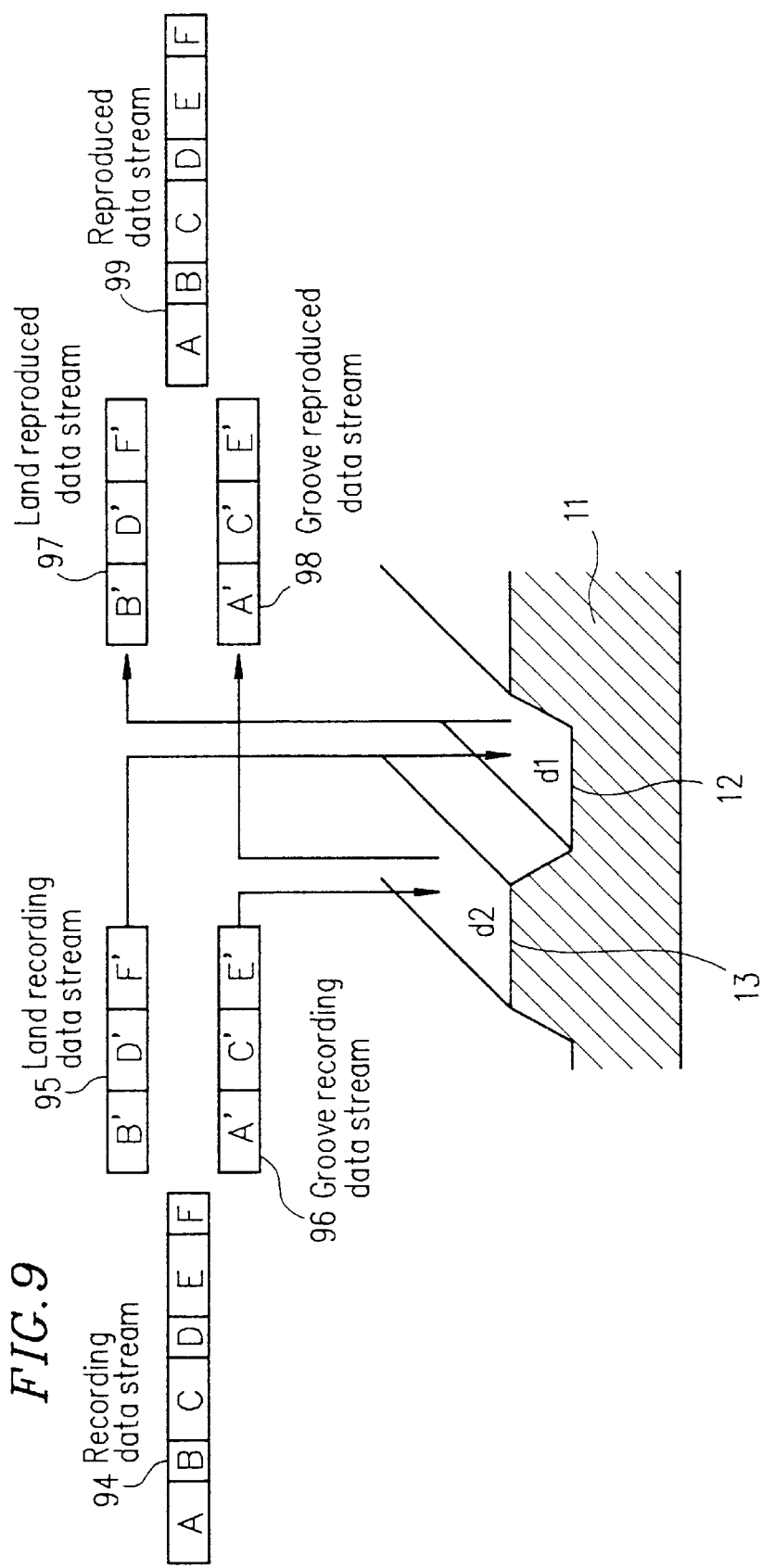
FIG. 9 schematically shows the division of the recording data and the combination of the reproduced data in a method for recording and reproducing onto/from an optical disk according to a fourth example of the present invention.

FIG. 9 schematically shows the division of the recording data and the combination of the reproduced data in a method for recording/reproducing onto/from an optical disk according to a fourth example of the present invention.

An optical disk 11 is a disk for which the land/groove recording operation can be performed as described in the first example, and has lands 12 and grooves 13. A land 12 has a recording density d1. This means that data having d1 bits can be recorded on a land 12 having a unit length. A groove 13 has a recording density d2. This means that data having d2 bits can be recorded on a groove 13 having a unit length.

The input recording data stream 94 is divided into a land recording data stream 95 and a groove recording data stream 96 at a ratio of (d1:d2). If (d1:d2) is assumed to be (1:2) for simplification, then the recording data stream 94 is divided, for example, into a group of blocks A, C and E having a data length of 16 bits and the other group of blocks B, D and F having a data length of 8 bits. The blocks A, C and E of the recording data stream 94 are subjected to various processings, such as a modulation and a formatting, for recording the blocks on the groove; converted into the groove recording data stream 96 (consisting of the blocks A', C' and E'); and then recorded on the groove 13 of the optical disk 11. On the other hand, the blocks B, D and F of the recording data stream 94 are subjected to similar processings for recording the blocks on the land; converted into the land recording data stream 95 (consisting of the blocks B', D' and F'); and then recorded on the land 12 of the optical disk 11.

The land recording data stream 95 and the groove recording data stream 96 are processed through respectively different signal paths. The land recording data stream 95 and the groove recording data stream 96 can be simultaneously recorded on the land and the groove, respectively, by using two laser beams or can be alternately recorded on the land and on the groove by using a single laser beam.

In FIG. 9, the length of the block A' is the same as that of the block A, which indicates that the transfer rate of the groove recording data stream 96 is the same as that of the recording data stream 94. On the other hand, the length of the block B' is twice of the length of the block B, which indicates that the transfer rate of the land recording data stream 95 is one half of that of the recording data stream 94. In other words, the land recording data stream 95 is obtained by partially time-axis expanding the recording data stream 94.

In the reproducing operation, a land reproduced data stream 97 (consisting of the blocks B', D' and F') reproduced from the land and a groove reproduced data stream 98 (consisting of the blocks A', C' and E') reproduced from the groove are processed through respectively different signal paths. The land recording data stream 95 and the groove recording data stream 96 can be simultaneously reproduced from the land and the groove, respectively, by using two laser beams or can be alternately reproduced from the land and the groove by using a single laser beam. To the contrary to the case of recording, the land reproduced data stream 97 is time-axis compressed and then combined with the groove reproduced data stream 98. In combining the land reproduced data stream 97 and the groove reproduced data stream 98, various processings such as a demodulation and a deformatting are performed, and then reproduced data 99 is output.

Figure 10:
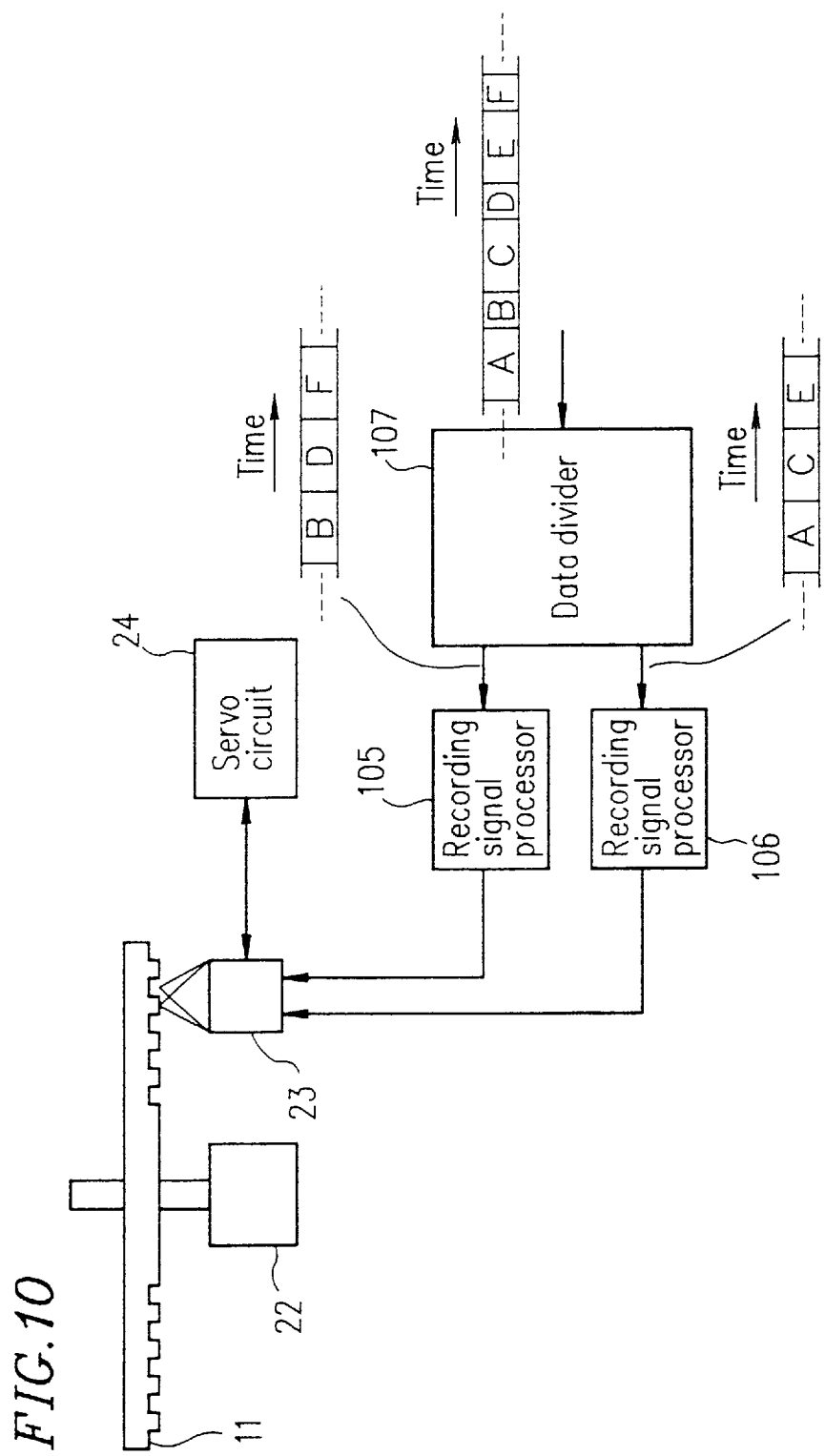
FIG. 10 is a block diagram showing a configuration for an apparatus for recording on an optical disk according to the fourth example of the present invention.

FIG. 10 is a block diagram showing a configuration for an apparatus for recording on an optical disk according to the fourth example of the present invention. The phase-changeable optical disk 11 for which the land/groove recording operation can be performed includes the lands having a recording density d1 and the grooves having a recording density d2. A mark edge recording operation is performed for the optical disk 11. The optical head 23 irradiates two laser beams described with reference to FIG. 2 onto the lands and the grooves.

A data divider 107 divides the input recording data stream (consisting of the blocks A to F) into the land recording data stream (consisting of the blocks B, D and F) and the groove recording data stream (consisting of the blocks A, C and E), as described with reference to FIG. 9. The data divider 107 divides the input recording data stream so that (the data length of a block of the land recording data stream):(the data length of a block of the groove recording data stream)= d1:d2. Therefore, (the transfer rate of the land recording data stream) (the transfer rate of the groove recording data stream)=d1:d2.

A recording signal processor 105 receives the land recording data stream and processes the data stream with modulation and recording compensation, thereby outputting a land recording signal to the optical head 23, while a recording signal processor 106 receives the groove recording data stream and processes the data stream with modulation and recording compensation, thereby outputting a groove recording signal to the optical head 23. As a modulation method, an EFM is used. The recording compensation can be performed by making different the timings for generating a plurality of pulses (by multi-pulse) on a land from those on a groove, as described above.

The apparatus for recording on an optical disk having the above-described configuration can record data so that the recording densities of a land and a groove become d1 and d2, respectively. As a result, the amount of the data which can be recorded can be increased on the optical disk as a whole.

Figure 11:
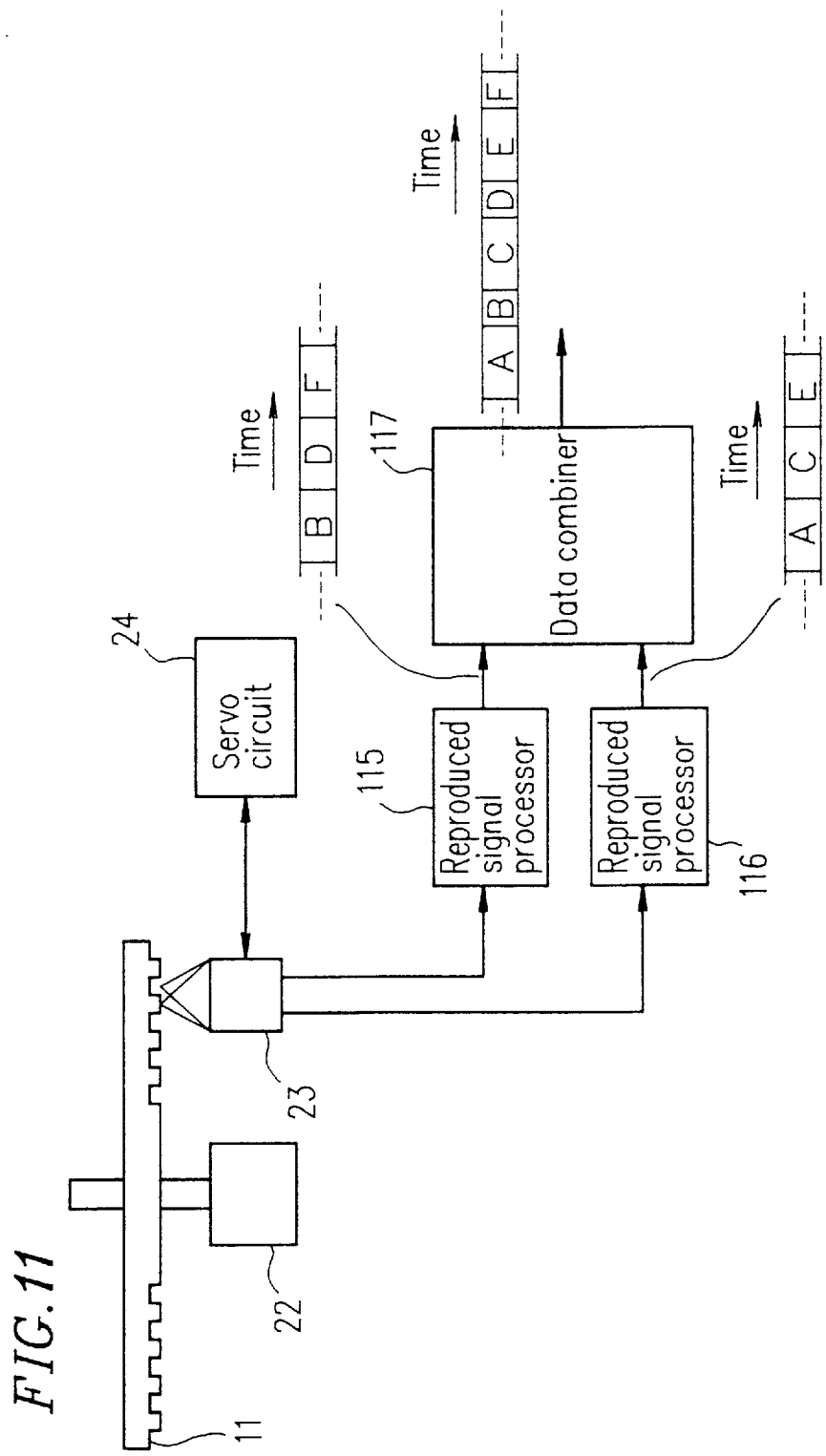
FIG. 11 is a block diagram showing a configuration for another apparatus for recording on an optical disk according to the fourth example of the present invention.

FIG. 11 is a block diagram showing a configuration for an apparatus for recording on an optical disk according to the fourth example of the present invention. On the phase-changeable optical disk 11, data is recorded on the land and the groove by the apparatus for recording on an optical disk shown in FIG. 10 by a mark edge recording method. The recording density of the land is d1 and the recording density of the groove is d2. The optical head 23 irradiates two laser beams onto the land and the groove, thereby outputting a land reproduced signal and a groove reproduced signal to a reproduced signal processor 115 and a reproduced signal processor 116, respectively.

The reproduced signal processors 115 and 116 receive the land reproduced signal and the groove reproduced signal and generate a land reproduced data and a groove reproduced data, respectively, so as to output the data to a data combiner 117. More specifically, the reproduced signal processors 115 and 116 process the received signal with amplification, equalization, digitization, and demodulation. Since the recording density on the land is different from the recording density on the groove, the transfer rate of the land reproduced data is different from that of the groove reproduced data. For example, when the recording density on the land is smaller than the recording density on the groove, i.e., when d1<d2, the transfer rate of the land reproduced data is smaller than that of the groove reproduced data.

The data combiner 117 receives and combines the land reproduced data and the groove reproduced data having different transfer rates, thereby outputting a reproduced data constituting by a single data sequence. The data combiner 117 includes a buffer memory, for example, and sequentially writes the land reproduced data and the groove reproduced data onto different regions in the buffer memory. In reading out the written data, the land reproduced data and the groove reproduced data can be alternately output by alternately moving a pointer of the buffer memory between the two recording regions.

By operating the apparatus for recording on an optical disk having the above-described configuration in the above-described manner, the data recorded on a land and a groove at different recording densities can be reproduced.

In the fourth example, as conditions for recording data, the recording density is varied based on whether a position of laser beam spot is located on the land or on the groove. By using the apparatus for recording on an optical disk and the apparatus for reproducing from an optical disk having the above-described configuration, the data can be recorded/reproduced onto/from a land and a groove, respectively having different recording densities, at suitable recording densities therefor. As a result, the quality of the signal to be recorded and reproduced, such as a bit error rate, an amount of servo margin and an amount of jitter, can be equalized between the land and the groove. Consequently, as compared with the case of employing either the recording/reproducing characteristics (the recording density, in this example) for the land or those for the groove, data can be recorded and reproduced at a higher density onto/from the optical disk as a whole.

Even when the frequency characteristics during the recording and reproducing operations are different from each other on a land and a groove, the recording density on the land is also different from that on the groove. Therefore, in such a case, the same effects can also be attained.

EXAMPLE 5

Figure 12:
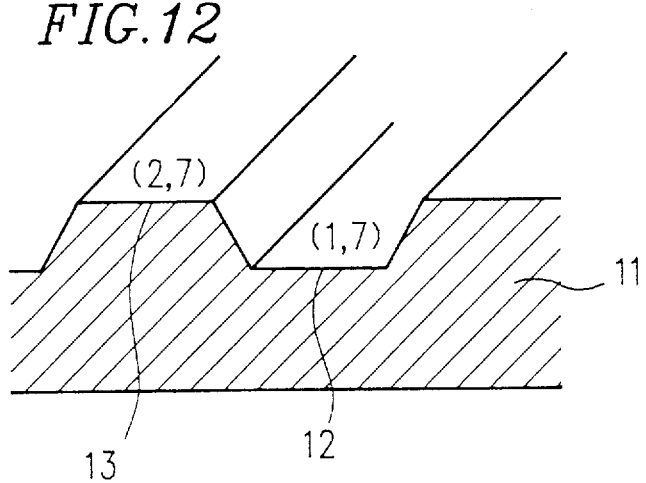
FIG. 12 shows a modulation method applicable to the land and the groove in a method for recording on an optical disk according to a fifth example of the present invention.

FIG. 12 shows a modulation method applicable to the land and the groove in a method for recording on an optical disk according to a fifth example of the present invention. The optical disk 11 is an optical disk, for which the land/groove recording operation can be performed, including lands 12 and grooves 13. In the optical disk 11 on which data is recorded on the lands and the grooves under the same conditions, the C/N ratio of the signal reproduced from a groove 13 is higher than that of the signal reproduced from a land 12. This is caused by the difference between the recording sensitivity of a land and that of a groove, and the difference between the reflectance of a land with respect to a laser beam and that of a groove. For example, the C/N ratio of the signal reproduced from a land is 52 dB, while the C/N ratio of the signal reproduced from a groove is 55 dB.

In such an optical disk 11, the data is recorded/reproduced onto/from a land 12 by a (1, 7) run length limited (RLL) modulation (hereinafter, simply referred to as a "(1, 7) modulation") having a low recording density ratio, while the data is recorded/reproduced onto/from a groove 13 by a (2, 7) modulation having a high recording density ratio. As a result, the data can be recorded on a land and a groove by different modulation methods suitable for the land and the groove, respectively. The "recording density ratio" herein means the number of the bits of the information included in the minimum inversion interval (hereinafter, such a ratio will be referred to as a "density ratio"). When the period of the data before the modulation is denoted by T, and the period of the data after the modulation (referred to as "detection window width") is denoted by $T_w$, then the period $T_w$ can be represented as follows:

(1, 7) modulation: $T_w=2T/3$ (2, 7) modulation: $T_w=T/2$

The minimum inversion interval $T_{min}$ can be represented as:

(1, 7) modulation: $T_{min}=2T_w$ (2, 7) modulation: $T_{min}=3T_w$

Figure 13:
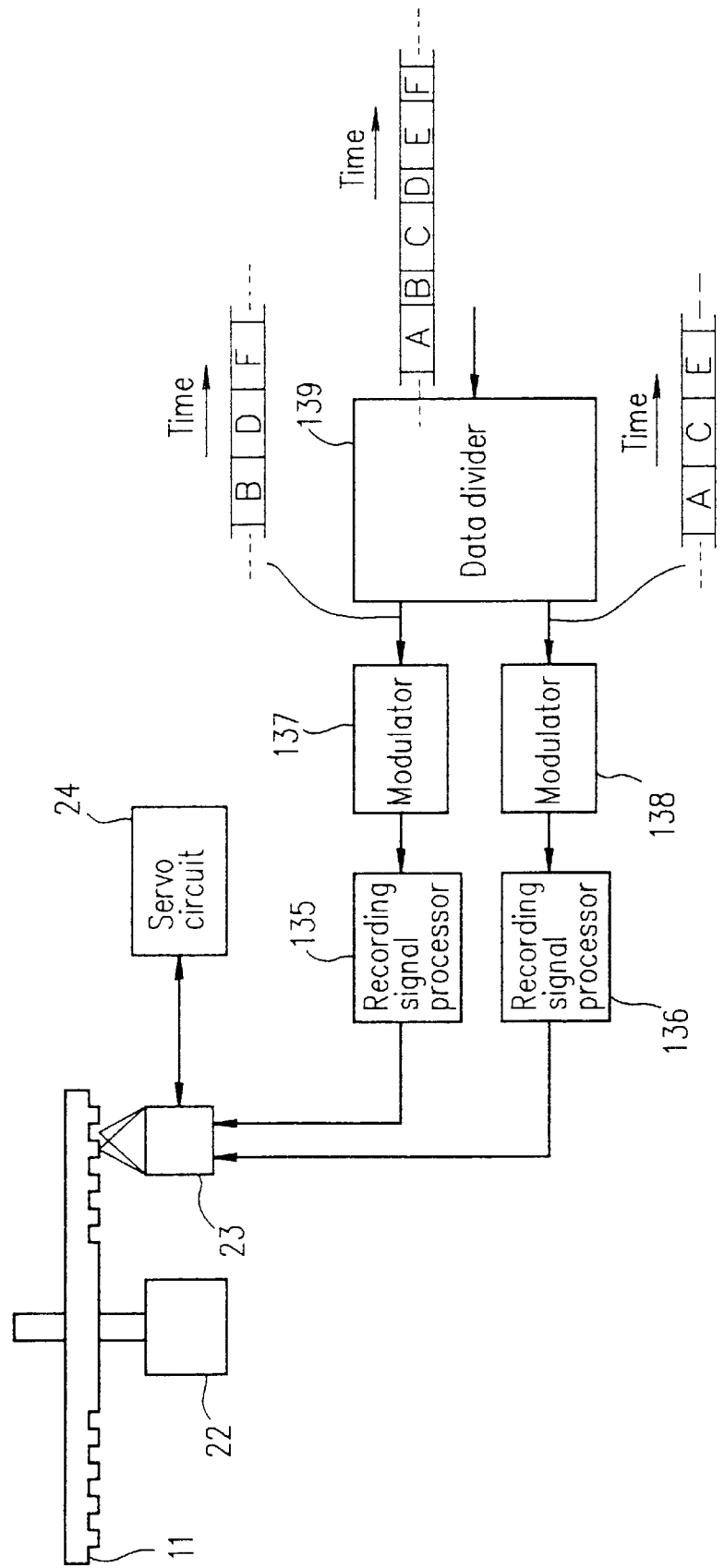
FIG. 13 is a block diagram showing a configuration for an apparatus for recording on an optical disk according to the fifth example of the present invention.

Therefore, the density ratio can be represented as:

(1, 7) modulation: $Dr=T_{min}/T=4/3=1.33$ (2, 7) modulation: $Dr=T_{min}/T=3/2=1.5$ FIG. 13 is a block diagram showing a configuration for an apparatus for recording on an optical disk according to the fifth example of the present invention. The optical disk 11 is a phase-changeable optical disk for which the land/groove recording operation can be performed. The optical disk 11 includes lands 12 and grooves 13 as shown in FIG. 1. The C/N ratio of the signal reproduced from a land 12 is lower than the C/N ratio of the signal reproduced from a groove 13. The data is recorded on the optical disk 11 by performing a mark edge recording operation. The optical head 23 simultaneously irradiates two laser beams onto the land and the groove as described with reference to FIG. 2, thereby recording the data thereon.

Similarly to the data divider 107 described with reference to FIG. 10, a data divider 139 divides the input digital data (consisting of the blocks A to F) into the land recording data stream (consisting of the blocks B, D and F) and the groove recording data stream (consisting of the blocks A, C and E), and then outputs the two data streams to modulators 137 and 138. In this case, the blocks A, C and E have the same data length and the blocks B, D and F have the same data length. Also, (the data length of the block A):(the data length of the block B)=1.33:1.5. The modulator 137 receives the land recording data stream and then modulates the data stream by the (1, 7) modulation method, while the modulator 138 receives the groove recording data stream and then modulates the data stream by the (2, 7) modulation method. Since the ratio of the data length of the blocks input to the modulators 137 and 138 is 1.33:1.5, the minimum inversion intervals are substantially equal in the two data subjected to the (1, 7) modulation and the (2, 7) modulation, respectively.

The recording signal processors 135 and 136 receive the outputs from the modulators 137 and 138, respectively, and then processes the data with a recording compensation, thereby outputting the data to the optical head 23 as the land recording signal and the groove recording signal. The recording signal processors 135 and 136 perform a recording compensation for making different the generation timings of a plurality of pulses as described above, and then amplify the data by an amount required for driving the laser diode (not shown) of the optical head 23. In response to the signals output from the recording signal processors 135 and 136, the optical head 23 records the data on the land and the groove, respectively. As a result, the (1, 7) modulated data is recorded on the land, and the (2, 7) modulated data is recorded on the groove. Therefore, it is possible to perform a recording operation so that the minimum inversion interval on the land is substantially equal to that on the groove and that the recording density on the land is different from that on the groove.

Figure 14:
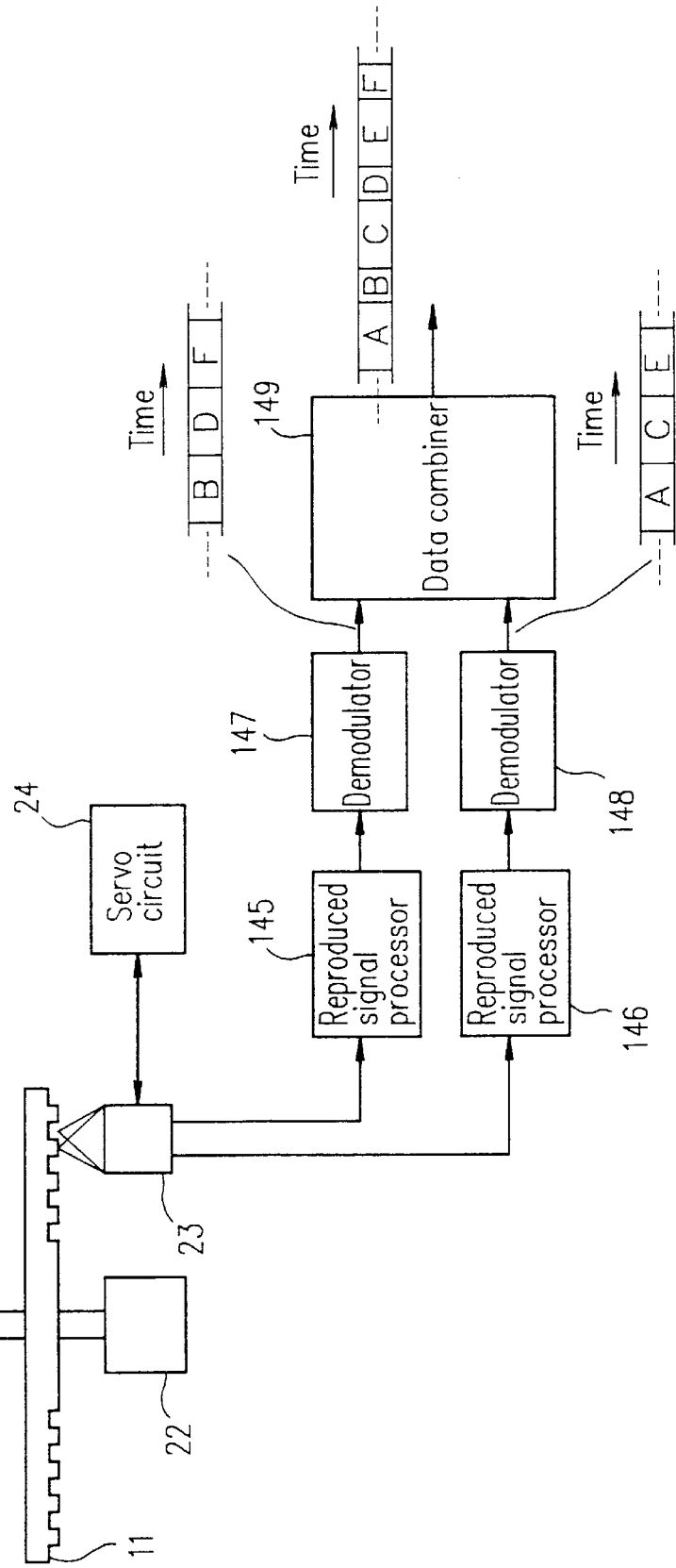
FIG. 14 is a block diagram showing a configuration for another apparatus for recording on an optical disk according to the fifth example of the present invention.

FIG. 14 is a block diagram showing a configuration for an apparatus for reproducing from an optical disk according to the fifth example of the present invention. The optical disk 11 includes lands 12 and grooves 13 as shown in FIG. 1. The data is recorded on the optical disk 11 by performing a mark edge recording operation. The (1, 7) modulated data is recorded on the land, and the (2, 7) modulated data is recorded on the groove. The optical head 23 can simultaneously reproduce the data from the land and the groove by irradiating two laser beams onto the land and the groove as described with reference to FIG. 2.

The optical head 23 outputs the land reproduced signal and the groove reproduced signal to reproduced signal processors 145 and 146, respectively, in accordance with the data recorded on the land and the groove. The reproduced signal processors 145 and 146 process the land reproduced signal and the groove reproduced signal, respectively, thereby outputting the digital data, i.e., the land reproduced data and the groove reproduced data to demodulators 147 and 148. More specifically, the reproduced signal processors 145 and 146 process the signal with amplification, equalization and digitization.

The demodulators 147 and 148 receive and demodulates the (1, 7) modulated land reproduced signal and the (2, 7) modulated groove reproduced signal, and then output the demodulated data to a data combiner 149. The data combiner 149 combines the demodulated land reproduced data with the demodulated groove reproduced data so as to output the combined data as a single data sequence.

Based on the above-described operation, the data can be reproduced from the optical disk in which the (1, 7) modulated data is recorded on the land and the (2, 7) modulated data is recorded on the groove. In the fifth example, when the C/N ratio of the signal reproduced from the land is different from the C/N ratio of the signal reproduced from the groove, the data is recorded by using a modulation method in which the land and the groove have an equal minimum inversion interval and different detection window widths. As a result, the quality of the recorded/reproduced signal can be equalized.

Next, a case where the land has a low C/N ratio will be described. In such a case, the data is recorded on the land and the groove by a modulation method in which the land and the groove have an equal minimum inversion interval and the detection window width on the land is larger than that on the groove. Even when a jitter at the same level is generated in reproducing the signal, the level of the jitter with respect to the detection window width is smaller on the land than on the groove because the detection window width on the land is larger than that on the groove. In this way, the lower C/N ratio on the land than the C/N ratio on the groove can be compensated for by changing the modulation method between the land and the groove. As a result, as compared with the case of recording and reproducing the data onto/from the land and the groove by the same modulation method, the data can be recorded/reproduced at a higher density onto/from the optical disk as a whole.

In the fifth example, the modulation method as conditions for recording data, and demodulation method as conditions for reproducing data are varied based on whether a position of laser beam spot is located on the land or on the groove. In the phase-changeable optical disk in which the C/N ratio on the land is 52 dB and the C/N ratio on the groove is 55 dB, the (1, 7) modulation is preferably used for recording data on the land, and the (2, 7) modulation is preferably used for recording data on the groove.

Even when the land and the groove have different frequency characteristics, the same effects can be attained by applying the method and the apparatus of the fifth example.

EXAMPLE 6

Figure 15A:
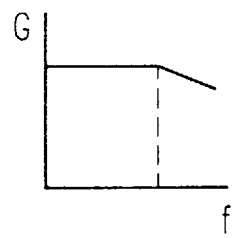
FIG. 15A is a graph showing the frequency/amplitude characteristics of the signal reproduced from a groove in a method for reproducing from an optical disk according to a sixth example of the present invention.
Figure 15B:
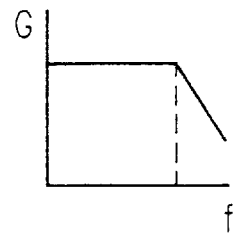
FIG. 15B is a graph showing the frequency/amplitude characteristics of the signal reproduced from a land in the method for reproducing from an optical disk according to the sixth example of the present invention.
Figure 15C:
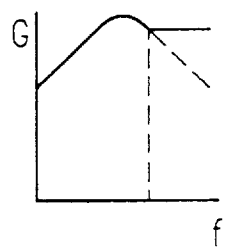
FIG. 15C is a graph showing the frequency characteristics obtained by the equalization processing for the signal reproduced from a groove in the method for reproducing from an optical disk according to the sixth example of the present invention.
Figure 15D:
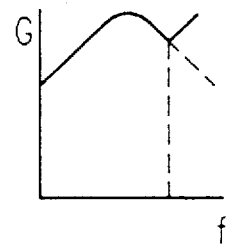
FIG. 15D is a graph showing the frequency characteristics obtained by the equalization processing for the signal reproduced from a land in the method for reproducing from an optical disk according to the sixth example of the present invention.
Figure 15E:
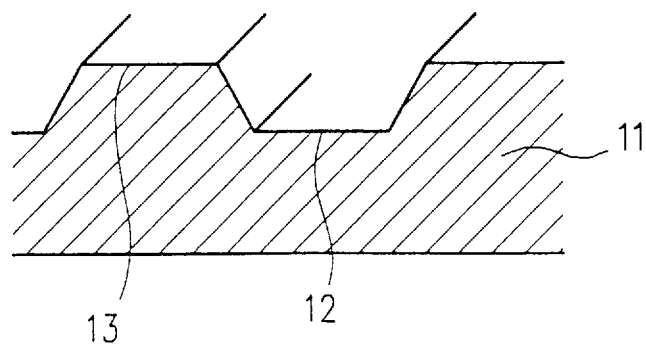
FIG. 15E is a perspective view showing a partial cross section of an optical disk to be used in the method for reproducing from an optical disk according to the sixth example of the present invention.

FIG. 15A is a graph showing the frequency/amplitude characteristics of the signal reproduced from a groove and FIG. 15B is a graph showing the frequency/amplitude characteristics of the signal reproduced from a land in a method for reproducing from an optical disk according to a sixth example of the present invention FIG. 15C is a graph showing the frequency characteristics obtained by the equalization processing for the signal reproduced from a groove and FIG. 15D is a graph showing the frequency characteristics obtained by the equalization processing for the signal reproduced from a land in the method for reproducing from an optical disk according to the sixth example of the present invention. FIG. 15E is a perspective view showing a partial cross section of an optical disk to be used in the method for reproducing from an optical disk according to the sixth example of the present invention. In FIGS. 15A to 15D, the abscissas indicate the frequency and the ordinates indicate the amplitude.

The optical disk 11 is an optical disk for which the land/groove recording operation for recording data both on a land 12 and a groove 13 can be performed. As shown in FIGS. 15A and 15B, the amplitude of the high frequency components of the signal reproduced from a land 12 is smaller than the amplitude of the high frequency components of the signal reproduced from a groove 13. In other words, the gain in the high band is higher on the groove than on the land. More specifically, the amplitude of the signal reproduced from the land 12 at a frequency of 5 MHz is lower than the amplitude of the signal reproduced from the groove 13 by 3 dB. Since the size and the shape of a beam spot formed on a land become different from those of a beam spot formed on a groove because the beam spot is focused on a land in a different state from that of the beam spot focused on a groove, the edge of the waveform of the signal reproduced from the land 12 becomes blunt even when a mark of the same shape is recorded on the land 12 and the groove 13.

In the case of performing the land/groove recording operation for such an optical disk 11, the frequency characteristics of the signal reproduced from a land are different from those of the signal reproduced from a groove. In view of such a difference, an equalization processing is performed for the reproduced signals. For example, by performing the emphasis of the high frequency components so as to obtain the frequency characteristics shown in FIGS. 15C and 15D, the equalization can be performed so that the reproduced signals can have desired frequency/amplitude characteristics. As a result, the bit error rate in the reproduced signals can be reduced.

Figure 16:
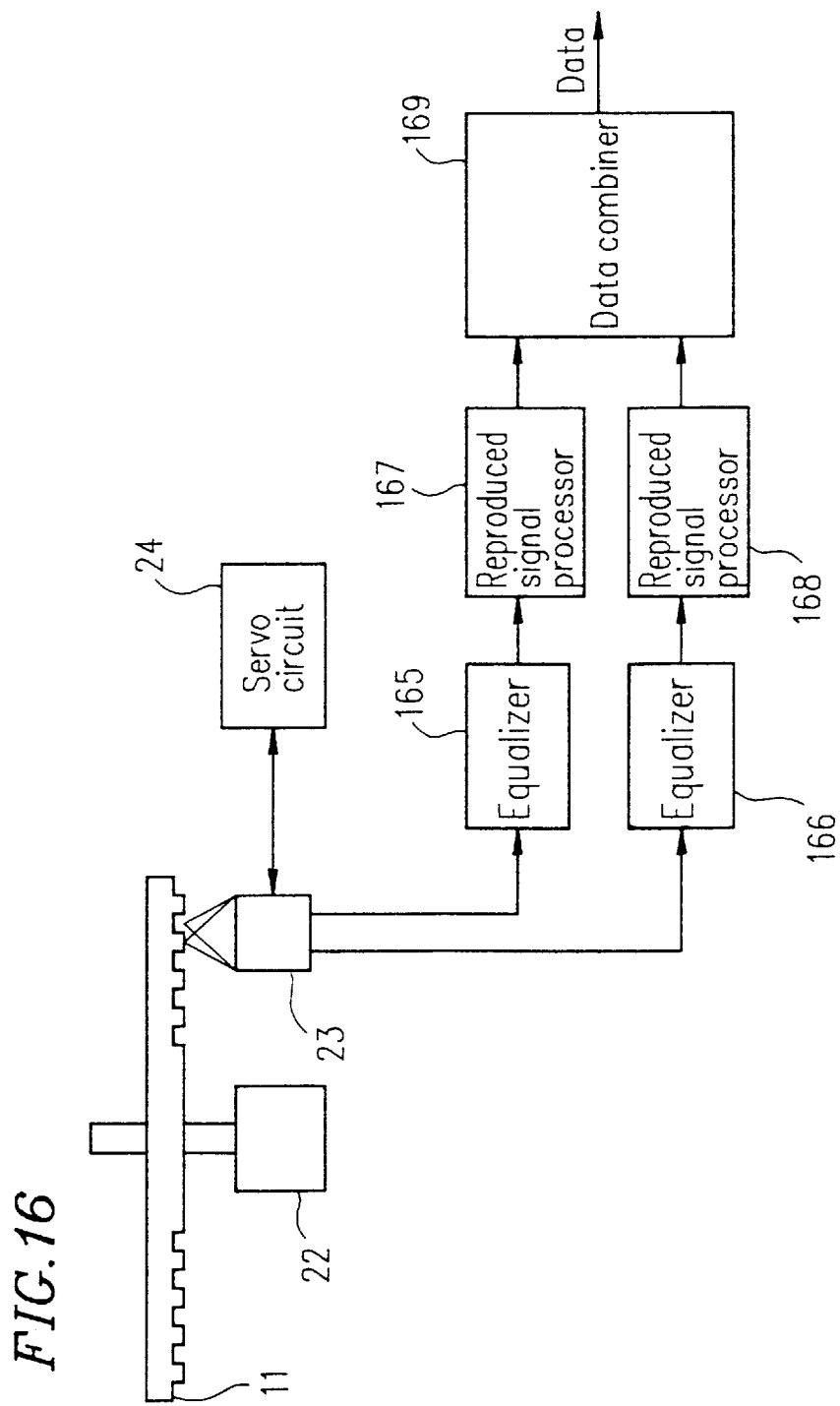
FIG. 16 is a block diagram showing a configuration for an apparatus for reproducing from an optical disk according to the sixth example of the present invention.

FIG. 16 is a block diagram showing a configuration for an apparatus for reproducing from an optical disk according to the sixth example of the present invention. As described with reference to FIG. 2, the optical head 23 reproduces the signals corresponding to the data recorded on a land and a groove, thereby outputting the land reproduced signal and the groove reproduced signal to the equalizers 165 and 166, respectively. As is apparent from the comparison between the frequency/amplitude characteristics of the land reproduced signal and those of the groove reproduced signal, the amplitude in the high band of the groove reproduced signal is larger than the amplitude in the high band of the groove reproduced signal because these two signals reproduced from a land and a groove on the optical disk 11 have different frequency characteristics as described above. The land reproduced signal and the groove reproduced signal are amplified by the equalizers 165 and 166, respectively, so as to obtain predetermined frequency characteristics. Then the amplified signals are output to the reproduced signal processors 167 and 168, respectively. In the high band, the equalizer 165 has a higher gain than that of the equalizer 166. As a result, the difference in the frequency/amplitude characteristics between the land reproduced signal and the groove reproduced signal is cancelled. The reproduced signal processors 167 and 168 receive the signals equalized by the equalizers 165 and 166, respectively, and convert the signals into digital data so as to output the data to a data combiner 169. The data combiner 169 has the same function as that of the data combiner 117 shown in FIG. 11. More specifically, the data combiner 169 multiplexes the input two digital data on the time axis, so as to output the multiplexed data as a single data sequence.

In the sixth example, as conditions for reproducing data, frequency characteristics for reproducing data are varied based on whether a position of laser beam spot is located on the land or on the groove. Specifically, as described above, by equalizing the signals reproduced from a land and a groove using the equalizers having different frequency characteristics, reproduced signals having desired frequency components can be obtained. As a result, even when the frequency characteristics of the land reproduced signal are different from those of the groove reproduced signal in an optical disk, the bit error rate can be reduced.

In the case of using an optical disk 11 having the parameters described in the first example, the difference between the frequency characteristics of the land reproduced signal and those of the groove reproduced signal can be cancelled if the gain of the equalizer 165 is higher than the gain of the equalizer 166 at a frequency of 5 MHz by 3 dB.

The method of the sixth example is applicable to the reproduction of the data recorded on an optical disk using the recording methods and apparatuses according to one of the first to fifth examples, thereby further reducing the bit error rate.

In the first to sixth examples, a phase-changeable optical disk is employed as the optical disk used in the present invention. Alternatively, the present invention is applicable to a magnetooptical disk.

In the first to sixth examples, the laser beam irradiation conditions and the recording conditions or the reproduction conditions are varied depending upon whether the data is recorded on a land or a groove. In order to realize such a recording operation, two laser beams can be used as described referring to FIG. 2, or a single laser beam can be used as described referring to FIG. 4. Alternatively, three or more laser beams can also be used for the recording operation.

In the first to sixth examples, a disk-shaped optical disk is employed as an exemplary recording medium used in the present invention. However, any recording medium can be used so long as data can be recorded on a land and a groove. For example, a card-shaped optical recording medium or a tape-shaped optical recording medium can also be used. A laser diode is used as a device for irradiating a light beam. However, a light beam can also be irradiated by combining a light-emitting element for emitting a light beam having a constant intensity and an optical modulator in which the transfer rate is varied in accordance with the input data.

It is noted that data recorded on an optical disk by using a method and an apparatus according to any one of the first to third examples of the present invention can be reproduced by using a conventional method and a conventional apparatus.

It is possible to combine the method described in the first to the sixth examples and to combine the apparatus described in the first to the sixth examples. For example, it is possible to combine the method and apparatus described in the first example in which different laser powers are used for a land and a groove, and the method and apparatus described in the second and the third examples in which the width and the timing of the recording pulse are changed. As a result, it is possible to set the size of the mark formed on a land or on a groove in the radial direction of the disk (this size will be called a "width" of the mark) and the size of the mark in the peripheral direction of the disk (this size will be called a "length" of the mark) at optimal values. That is to say, the variation in the laser power mainly contributes to the variation in the width of the mark, while the variations in the pulse width and the pulse timing mainly contribute to the variation in the length of the mark.

According to the present invention, a laser beam is irradiated at a different laser power depending upon whether the data is recorded on a land or a groove, so that the bit error rate can be advantageously reduced.

According to the present invention, a laser beam is irradiated at a different pulse width depending upon whether the data is recorded on a land or a groove, so that the edge shift can be reduced and the bit error rate can also be reduced.

According to the present invention, a different recording compensation is performed depending upon whether the data is recorded on a land or a groove, so that the quality of the reproduced signals can be equalized and a high-density recording operation can be performed.

According to the present invention, a recording operation is performed at a different recording density depending upon whether the data is recorded on a land or a groove, so that a high-density recording operation can be performed.

According to the present invention, a recording operation is performed by a different modulation method depending upon whether the data is recorded on a land or a groove, so that a high-density recording operation can be performed.

According to the present invention, the different frequency characteristics of the reproduced signals are equalized depending upon whether the data is reproduced from a land or a groove, so that the bit error rate can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk recording method for recording data on an optical disk including a land and a groove by forming a mark representing the data on the optical disk by irradiating a light beam onto the optical disk, wherein conditions for irradiating the light beam are varied by actively adjusting the intensity of the light beam depending upon whether a position at which the mark representing the data is formed is located on the land or on the groove so that a size of the mark formed on the land is equal to a size of the mark formed on the groove and the intensity of the light beam is actively adjusted to be irradiated at a different intensity depending upon whether the light beam is irradiated onto the land or onto the groove, and an intensity of the light beam irradiated onto the land is higher than an intensity of the light beam irradiated onto the groove.

2. An optical disk recording apparatus for recording data on an optical disk including a land and a groove by forming a mark representing the data on the optical disk by irradiating a light beam onto the optical disk, wherein the optical disk recording apparatus comprises a means for varying conditions for irradiating the light beam by actively adjusting the intensity of the light beam depending upon whether a position at which the mark representing the data is formed is located on the land or on the groove so that a size of the mark formed on the land is equal to a size of the mark formed on the groove, and further comprising means for recording the data by irradiating the light beam at a different intensity depending upon whether the light beam is irradiated onto the land or onto the groove as a result of the active adjustment of the intensity of the light beam, and wherein an intensity of the light beam irradiating onto the land is higher than an intensity of the light beam irradiated onto the groove.

3. An optical disk recording apparatus for recording data on an optical disk including a land and a groove by forming a mark representing the data on the optical disk by irradiating a light beam onto the optical disk, wherein the optical disk recording apparatus comprises a means for varying conditions for irradiating the light beam depending upon whether a position at which the mark representing the data is formed is located on the land or on the groove so that a size of the mark formed on the land is equal to a size of the mark formed on the groove, and further comprising:

a data division means for dividing an input data into a first data and a second data;

a first light beam generation means for recording the first data on the land by irradiating a light beam having a first intensity onto the land; and a second light beam generation means for recording the second data on the groove by irradiating a light beam having a second intensity onto the groove.

4. An optical disk recording apparatus for recording data on an optical disk including a land and a groove by forming a mark representing the data on the optical disk by irradiating a light beam onto the optical disk, wherein the optical disk recording apparatus comprises a means for varying conditions for irradiating the light beam by actively adjusting the intensity of the light beam depending upon whether a position at which the mark representing the data is formed is located on the land or on the groove so that a size of the mark formed on the land is equal to a size of the mark formed on the groove, and further comprising a means for generating land/groove position information showing whether a spot of the light beam is located on the land or on the groove; and a means for irradiating the light beam at a different intensity based on the land/groove position information as a result of the active adjustment of the intensity of the light beam, wherein the optical disk comprises a phase-changeable recording layer.

5. An optical disk recording method for recording data on an optical disk including a land and a groove by forming a mark representing the data on the optical disk by irradiating a light beam onto the optical disk, wherein conditions for irradiating the light beam are varied depending upon whether a position at which the mark representing the data is formed is located on the land or on the groove so that a size of the mark formed on the land is equal to a size of the mark formed on the groove, the light beam is irradiated for a different time period depending upon whether the light beam is irradiated onto the land or onto the groove, and a time period during which the light beam is irradiated onto the land is longer than a time period during which the light beam is irradiated onto the groove.

6. An optical disk recording method for recording data on an optical disk including a land and a groove by forming a mark representing the data on the optical disk by irradiating a light beam onto the optical disk, wherein conditions for irradiating the light beam are varied depending upon whether a position at which the mark representing the data is formed is located on the land or on the groove so that a size of the mark formed on the land is equal to a size of the mark formed on the groove, and comprising a step of irradiating the light beam n (where n is an integer equal to or larger than 2) times in order to form the mark, wherein a timing for performing a first irradiation and a timing for performing an n-th irradiation are varied depending upon whether the light beam is irradiated onto the land or onto the groove.

7. An optical disk recording method according to claim 6, wherein an interval between the first irradiation and the n-th irradiation for the land is longer than an interval between the first irradiation and the n-th irradiation for the groove.

8. An optical disk recording apparatus for recording data on an optical disk including a land and a groove by forming a mark representing the data on the optical disk by irradiating a light beam onto the optical disk, wherein the optical disk recording apparatus comprises a means for varying conditions for irradiating the light beam depending upon whether a position at which the mark representing the data is formed is located on the land or on the groove so that a size of the mark formed on the land is equal to a size of the mark formed on the groove, and further comprising means for generating land/groove position information showing whether a spot of the light beam is located on the land or on the groove; and means for irradiating the light beam n (where n is an integer equal to or larger than 2) times in order to form the mark and varying the timing for performing a first irradiation and a timing for performing an n-th irradiation depending upon whether the light beam is irradiated onto the land or onto the groove.

9. An optical disk recording apparatus according to claim 8, wherein an interval between the first irradiation and the n-th irradiation for the land is longer than an interval between the first irradiation and the n-th irradiation for the groove.

10. An optical disk recording method for recording data on an optical disk including a land and a groove by forming a mark representing the data on the optical disk by irradiating a light beam onto the optical disk, wherein the data is recorded onto the optical disk using different data recording formats depending upon whether the light beam is irradiated onto the land or onto the groove.

11. An optical disk recording method according to claim 10, wherein the data is recorded at a different density depending upon whether the light beam is irradiated onto the land or onto the groove.

12. An optical disk recording method according to claim 11, wherein a density of the data recorded on the land is lower than a density of the data recorded on the groove.

13. An optical disk recording method according to claim 10, comprising a step of recording the data by a different modulation method depending upon whether the light beam is irradiated onto the land or onto the groove.

14. An optical disk recording method according to claim 13, wherein a density ratio of the modulation method used for recording the data on the land is lower than a density ratio of the modulation method used for recording the data on the groove.

* * * * *

UNITED STATES PATENT AND TRADEMARK OFFICE
CERTIFICATE OF CORRECTION

PATENT NO.: 5,850,378

DATED: December 15, 1998

INVENTOR(S): Jun-ichi Minamino et al.

It is certified that error appears in the above-identified patent and that said Letters Patent is hereby corrected as shown below:

On the Cover Sheet under [75] Inventors:

Please replace "Jun-ichi Ninamino" with --Jun-ichi Minamino--.

Signed and Sealed this

Twenty-seventh Day of March, 2001

Attest:

NICHOLAS P. GODICI

Attesting Officer

Acting Director of the United States Patent and Trademark Office